United States Patent
Kinoshita

(10) Patent No.: US 8,436,910 B2
(45) Date of Patent: May 7, 2013

(54) IMAGE PROCESSING APPARATUS AND IMAGE PROCESSING METHOD

(75) Inventor: Hiroyuki Kinoshita, Tokyo (JP)

(73) Assignee: Sony Corporation, Tokyo (JP)

( * ) Notice: Subject to any disclaimer, the term of this patent is extended or adjusted under 35 U.S.C. 154(b) by 588 days.

(21) Appl. No.: 12/496,195

(22) Filed: Jul. 1, 2009

(65) Prior Publication Data
US 2010/0039539 A1 Feb. 18, 2010

(30) Foreign Application Priority Data
Aug. 12, 2008 (JP) ................................ 2008-208038

(51) Int. Cl.
*H04N 5/228* (2006.01)
*H04N 9/73* (2006.01)
*H04N 5/217* (2006.01)
*G06K 9/00* (2006.01)

(52) U.S. Cl.
USPC ................... 348/222.1; 348/223.1; 348/241; 382/162; 382/167

(58) Field of Classification Search ............... 348/222.1, 348/223.1, 235, 241; 382/162, 167, 254, 382/263, 266, 199
See application file for complete search history.

(56) References Cited

U.S. PATENT DOCUMENTS

| | | | | |
|---|---|---|---|---|
| 4,991,021 A | * | 2/1991 | Nikoh et al. | 348/606 |
| 5,469,212 A | * | 11/1995 | Lee | 375/240.23 |
| 2006/0093205 A1 | * | 5/2006 | Bryll et al. | 382/152 |
| 2006/0251322 A1 | * | 11/2006 | Palum et al. | 382/167 |
| 2007/0116375 A1 | * | 5/2007 | Utsugi et al. | 382/264 |

FOREIGN PATENT DOCUMENTS

| | | |
|---|---|---|
| JP | 11-55695 A | 2/1999 |
| JP | 2000-299874 A | 10/2000 |
| JP | 2006-20275 | 1/2006 |
| JP | 2007-202128 A | 8/2007 |
| JP | 2008-147981 A | 6/2008 |
| WO | WO 2005/101854 A1 | 10/2005 |

* cited by examiner

*Primary Examiner* — Chieh M Fan
*Assistant Examiner* — Peter Chon
(74) *Attorney, Agent, or Firm* — Oblon, Spivak, McClelland, Maier & Neustadt, L.L.P.

(57) ABSTRACT

An image processing apparatus and an image processing method are provided that enable accurate detection of color shift occurring due to chromatic difference of magnification. An image processing apparatus includes an image signal extraction unit to extract at least a part of an image signal from image data based on signal characteristics of the image signal, an edge detection unit to detect an edge portion in an image by the image data from a detection target that is the extracted image signal based on a luminance value of the image signal, and a color shift amount detection unit to detect a color shift amount by calculating a correlation of at least two color components contained in the image signal according to a distance from a reference position in the image.

11 Claims, 26 Drawing Sheets

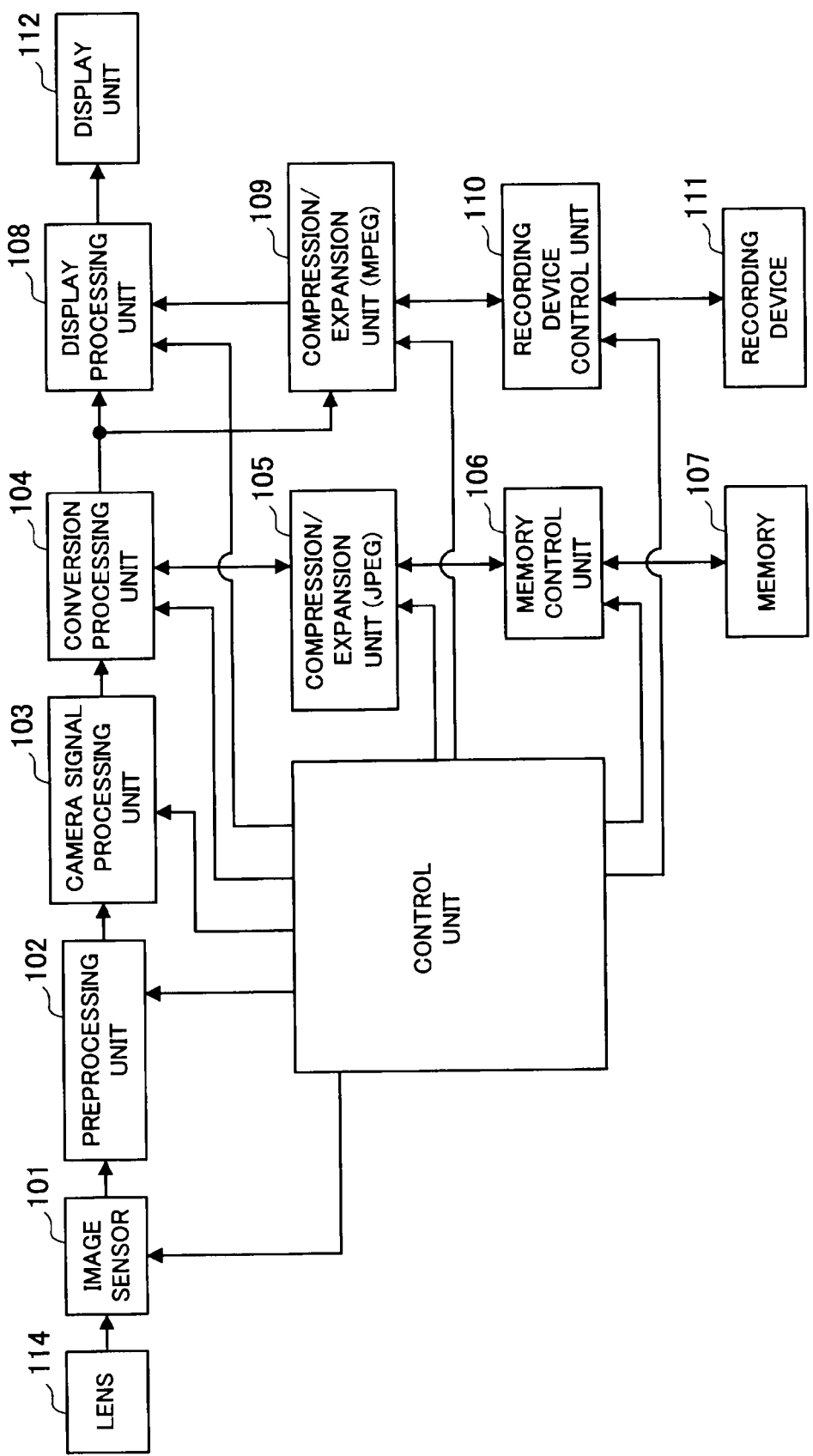

IMAGING PLANE

SATURATION LEVEL

IMAGING PLANE

IMAGING PLANE

SATURATION LEVEL

IMAGING PLANE

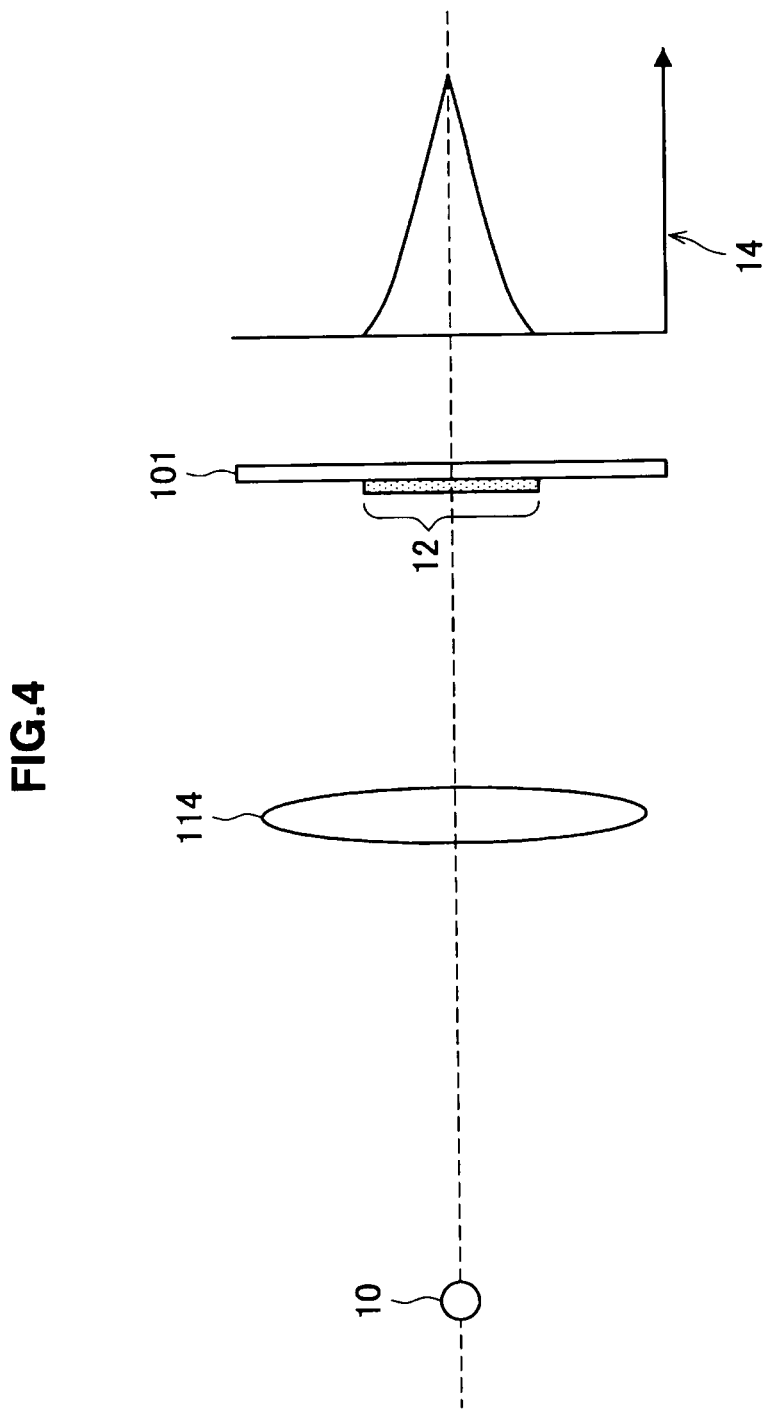

CENTER OF
OPTICAL AXIS (0,0)

FIG.10A
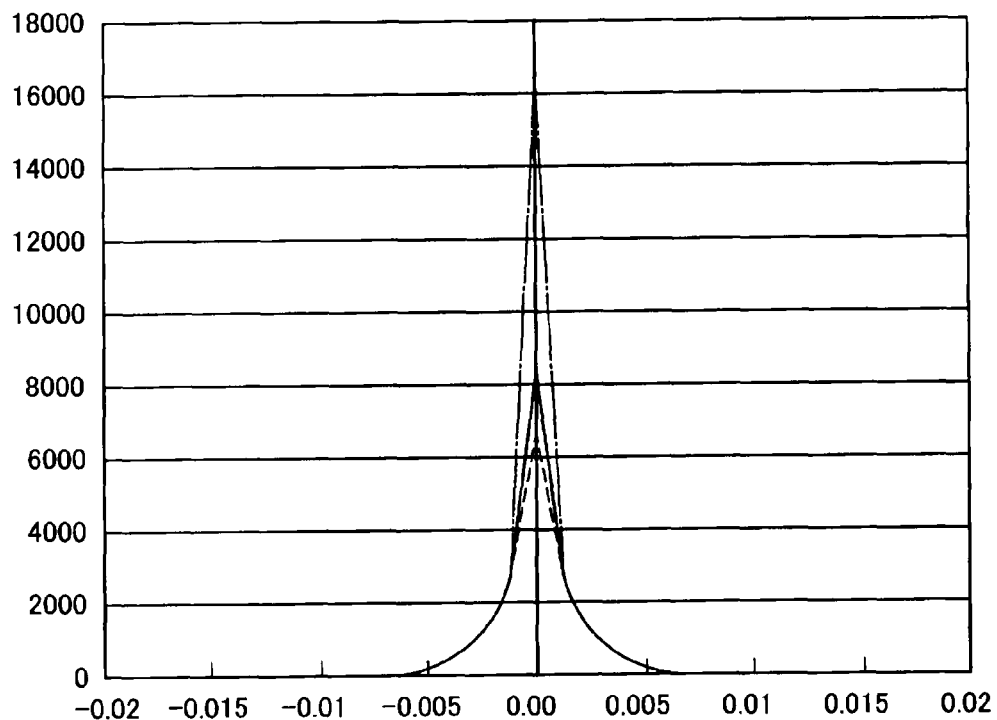
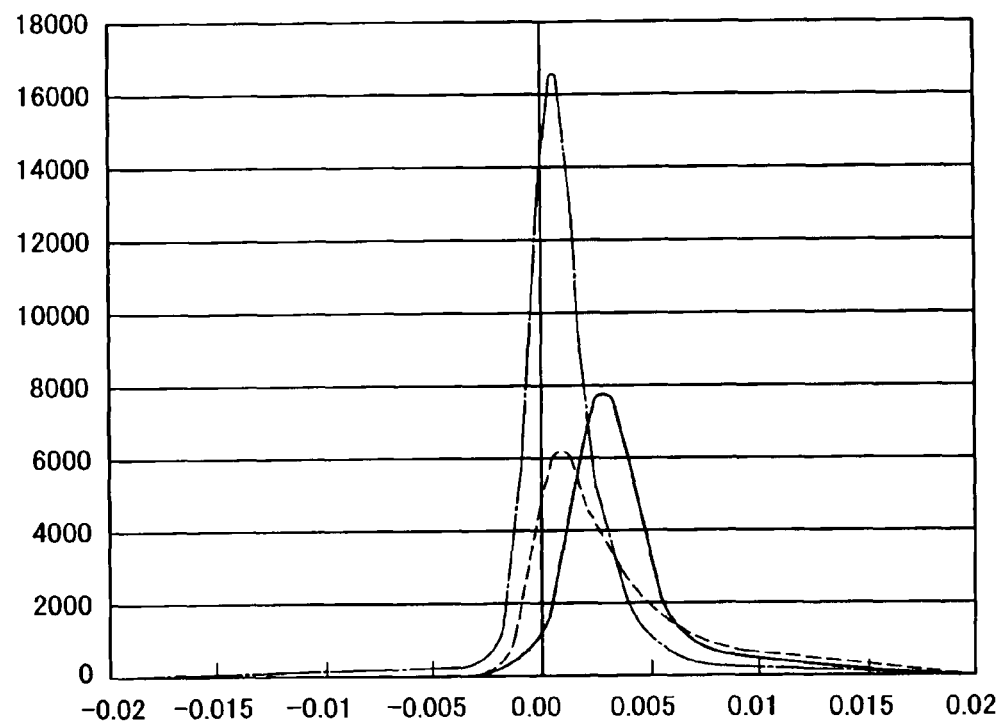

IMAGE HEIGHT SMALL

IMAGE HEIGHT LARGE

EDGE STRENGTH LOW

EDGE STRENGTH HIGH

NOISE

NOISE

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of Related Art

In an imaging apparatus such as a still camera or a video camera, chromatic difference of magnification occurs due to an optical system such as a lens. The chromatic difference of magnification occurs because the refractive index of a lens differs depending on the wavelength of visible light and thus the focal length is different, resulting in a difference in image size.

If a picture of a white point light source is taken with a lens where the chromatic difference of magnification occurs, the peripheral part of an image plane is colored like a rainbow, and the light source appears like extending in the radiation direction. Further, in the case of a general subject also, color shift occurs significantly particularly at the edge of an image. Thus, a technique of detecting color shift due to the chromatic difference of magnification and correcting an image is disclosed in Japanese Unexamined Patent Publication No. 2006-20275, for example.

SUMMARY OF THE INVENTION

The technique of Japanese Unexamined Patent Publication No. 2006-20275 performs detection and correction of color shift based on RAW data that is obtained from an image pickup device such as CCD or CMOS. In the detection of color shift, a detection target region is the edge portion of an image. However, there is a concern that the edge portion of an image is not detected accurately because the frequency characteristics of the edge portion are degraded due to a false color caused by fringe when a luminance value of an image signal is saturated. There is also a concern that the edge portion of an image is not detected accurately because the frequency characteristics of the edge portion are degraded due to a false color caused by fringe owing to point image spread in the vicinity of a certain pixel by the point spread function (PSF). As a result of failure to detect the edge portion accurately, the detection accuracy of color shift is degraded.

In light of the above concerns, it is desirable to provide a novel and improved image processing apparatus and image processing method that enable accurate detection of color shift occurring due to the chromatic difference of magnification.

According to an embodiment of the present invention, there is provided an image processing apparatus including an image signal extraction unit to extract at least a part of an image signal from image data based on signal characteristics of the image signal, an edge detection unit to detect an edge portion in an image by the image data from a detection target that is the extracted image signal based on a luminance value of the image signal, and a color shift amount detection unit to detect a color shift amount by calculating a correlation of at least two color components contained in the image signal according to a distance from a reference position in the image.

The image signal extraction unit may include a determination unit to determine whether the luminance value of the image signal is at a saturation level or near the saturation level, and a first extraction unit to extract the image signal different from the image signal determined to be at the saturation level or near the saturation level.

The image signal extraction unit may include a distance calculation unit to calculate a distance of the image signal from the reference position in the image, and a second extraction unit to extract the image signal according to the distance.

The edge detection unit may include a threshold calculation unit to calculate a threshold for edge detection based on a luminance value of a whole or at least a part of the image signal contained in the image data, and the edge detection unit may detect the edge portion in the image by the image data based on the threshold.

According to another embodiment of the present invention, there is provided an image processing method including the steps of extracting at least a part of an image signal from image data based on signal characteristics of the image signal, detecting an edge portion in an image by the image data from a detection target that is the extracted image signal based on a luminance value of the image signal, and detecting a color shift amount by calculating a correlation of at least two color components contained in the image signal according to a distance from a reference position in the image.

According to the embodiments of the present invention, it is possible to accurately detect color shift occurring due to the chromatic difference of magnification.

BRIEF DESCRIPTION OF THE DRAWINGS

FIG. 1 is a block diagram showing an imaging apparatus according to an embodiment of the present invention.

FIG. 4 is an explanatory view showing the relationship of a point light source 10, a lens 114, a point image 12 on an image pickup device 101 and a PSF 14.

FIG. 10A is a graph showing a point spread function.

DETAILED DESCRIPTION OF PREFERRED EMBODIMENTS

Figure 2A:
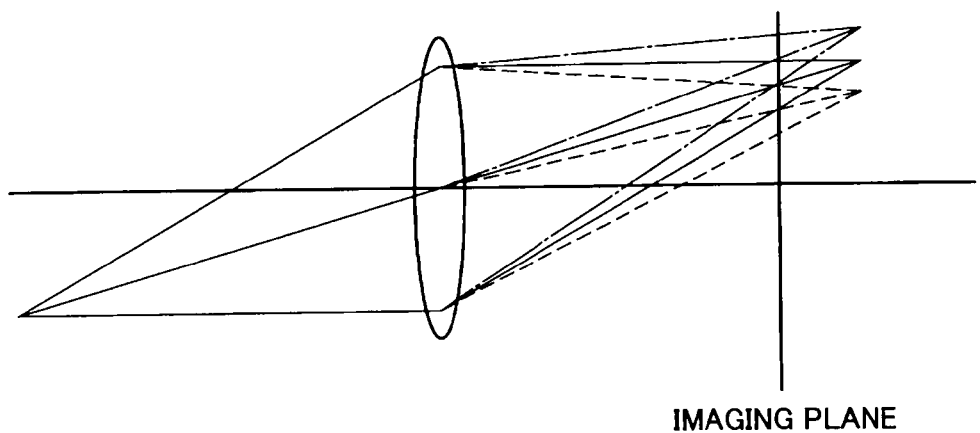
FIGS. 2A and 2B are explanatory views showing the relationship between a lens and an imaging plane and the relationship between an imaging plane and a PSF, respectively.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

An imaging apparatus 100 according to an embodiment of the present invention may be applied not only to a digital still camera in which a lens 114 is exchangeable or not exchangeable but also to another device having an imaging function such as a camcorder, a cellular phone or a PDA (Personal Digital Assistants), for example. Further, the imaging apparatus 100 according to an embodiment may be applied also to a processing device that processes an imaging signal by a miniature camera for picturephone or game software connected to a personal computer or the like and a recording device.

Further, processing functions of the imaging apparatus 100, which are described later, may be implemented by hardware or software. Image processing in the following description is processing that is performed on the R, G and B components of input data (RAW data) in the signal processing of the imaging apparatus 100.

The configuration of the imaging apparatus 100 according to an embodiment of the present invention is described firstly. FIG. 1 is a block diagram showing the imaging apparatus according to the embodiment.

The imaging apparatus 100 shown in FIG. 1 is a video camera capable of recording video data in a storage medium.

The imaging apparatus 100 includes an image sensor 101, a preprocessing unit 102, a camera signal processing unit 103, a conversion processing unit 104, a compression/expansion unit 105, a memory control unit 106, a memory 107, a display processing unit 108, a compression/expansion unit 109, a recording device control unit 110, a recording device 111, a display unit 112, a control unit 113, an image pickup lens 114 and so on, for example.

The image pickup lens 114 is a set of lenses that condense incident light from a subject and form an image of the subject on the image sensor 101, which is described later. The chromatic difference of magnification occurs because, when light from a subject passes through the image pickup lens 114, the refractive index differs depending on the wavelength of visible light and thus the focal length differs depending on the color, which results in the shift of an image focus location. Further, the chromatic difference of magnification occurs also because each color spreads in an image focus location by the point spread function (PSF) of the image pickup lens 114, and a difference in the width of spread between the colors results in a false color.

The image sensor 101 converts incident light from a subject that is captured through an optical system (which includes the image pickup lens 114, an infrared ray cut filter, an optical low-pass filter and so on, for example) into an electric signal by photoelectric conversion. For example, a CMOS (Complementary Metal-Oxide Semiconductor) image pickup device may be used as the image sensor 101. In the case of the CMOS image pickup device, a photodiode, a row/column selection MOS transistor, a signal line and so on are arranged two-dimensionally, and a vertical scanning circuit, a horizontal scanning circuit, a noise cancellation circuit, a timing generation circuit and so on are formed. Alternatively, a CCD (Charge Coupled Device) may be used as the image sensor 101.

The image sensor 101 reads a signal at a frame rate of 60 fps (fields/second), which is the NTSC specifications, for example. The image sensor 101 may read a signal more rapidly at a frame rate higher than 60 fps, such as 240 fps that is four times the normal rate, for example. The image sensor 101 includes a CDS (Correlated Double Sampling) and an A/D converter, and imaging data is output from the image sensor 101.

The preprocessing unit 102 performs optical correction processing such as shading correction on the imaging data that is output from the image sensor 101 and then outputs a digital image signal. The preprocessing unit 102 performs detection and correction of the chromatic difference of magnification, which is described later. The preprocessing unit 102 includes an image signal extraction unit that extracts at least a part of an image signal from image data, an edge detection unit that detects an edge portion in the image by the image data from the extracted image signal as a detection target based on a luminance value of the image signal, and a color shift amount detection unit that detects a color shift amount by calculating a correlation of at least two color components contained in the image signal according to a distance from a reference position in the image.

The camera signal processing unit 103 performs camera signal processing, such as synchronization processing, white balance correction, aperture correction, gamma correction and YC generation, on the imaging data supplied from the preprocessing unit 102.

The conversion processing unit 104 performs pixel skipping and size adjustment for converting the image signal supplied from the camera signal processing unit 103 into a frame rate and a screen size adequate for display on the display unit 112. The pixel skipping is performed when output to the display processing unit 108.

The compression/expansion unit 105 performs compression encoding processing on the imaging data supplied from the conversion processing unit 104 by an encoding scheme for still images such as the JPEG (Joint Photographic Experts Group) standard. Further, the compression/expansion unit 105 performs expansion decoding processing on encoded data of still images supplied from the memory control unit 106. The memory control unit 106 controls writing and reading of image data to and from the memory 107. The memory 107 is a FIFO (First-In First-Out) buffer memory that temporarily stores the image data supplied from the memory control unit 106, and it may be SDRAM (Synchronous Dynamic Random Access Memory), for example.

The display processing unit 108 generates an image signal to be displayed on the display unit 112 from the image signal supplied from the conversion processing unit 104 or the compression/expansion unit 109 and supplies the generated image signal to the display unit 112, so that the image is displayed. The display unit 112 may be an LCD (Liquid Crystal Display), for example, and it displays camera-through images currently shot, images of data recorded on the recording device 111 or the like.

The compression/expansion unit 109 performs compression encoding processing on the image data supplied from the conversion processing unit 104 by an encoding scheme for moving images such as the MPEG (Moving Picture Experts Group) standard. Further, the compression/expansion unit 109 performs expansion decoding processing on encoded data of moving images supplied from the recording device 111 and outputs a result to the display processing unit 108. The display unit 112 displays the moving images supplied from the display processing unit 108.

The control unit 113 may be a microcomputer composed of a CPU (Central Processing Unit), ROM (Read Only Memory), RAM (Random Access Memory) and so on. The control unit 113 executes a program stored in the ROM or the like and thereby controls the elements of the imaging apparatus 100 overall.

An operation for detection and correction of the chromatic difference of magnification by image signal processing is described hereinafter.

In this embodiment, detection and correction of the chromatic difference of magnification are performed using RAW data. Specifically, an interpolated G component is generated from the nearby G component in the respective positions of an R component and a B component, and a false luminance signal is generated by the R component and the interpolated G component in the aligned pixel positions and the B component and the interpolated G component in the aligned pixel positions. Because the chromatic difference of magnification occurs in the vicinity of the luminance edge, a high-frequency component is detected (edge is detected) by using the false luminance signal. In a certain direction, the amount of shift between (a window of) the interpolated G component and (a window of) the R or B component in the position of the high frequency is detected with respect to each image height. Then, the shift amount is detected in various directions, a histogram of the shift amount at each image height is created, and the mode value at each image height is detected as a final shift amount, which is aberration. The correction is performed on the R component and the B component, and a pixel value in the position shifted by the detected shift amount is interpolated.

Figure 18:
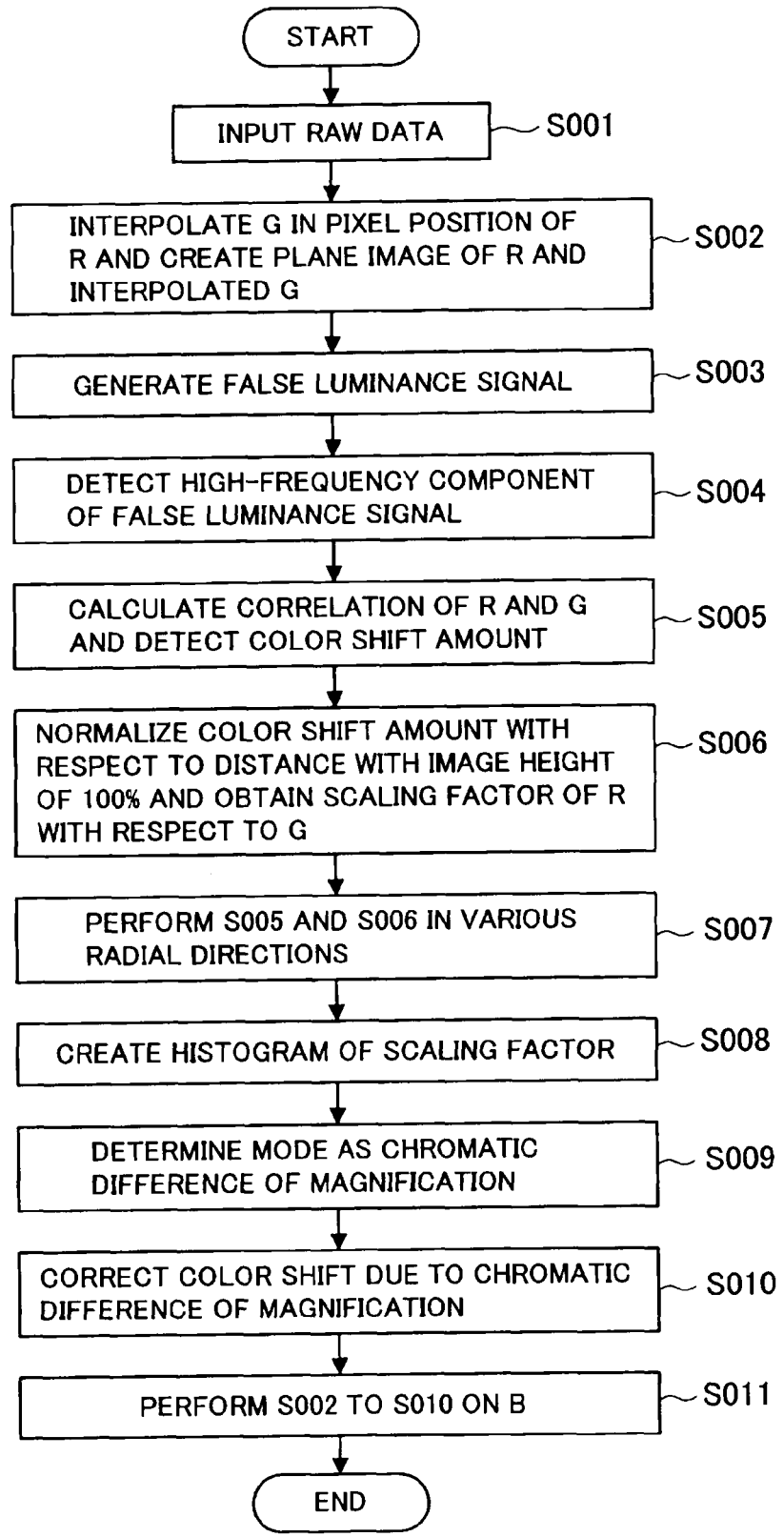
FIG. 18 is a flowchart showing an operation for detection and correction of chromatic difference of magnification.

FIG. 18 is a flowchart showing an operation for detection and correction of the chromatic difference of magnification.

First, RAW data is input, since detection and correction of the chromatic difference of magnification is performed on the RAW data (Step S001).

Next, a G component is interpolated in the pixel position of an R component (Step S002). The G component that is interpolated is referred to hereinafter as the interpolated G component. The interpolated G component is obtained by averaging with use of a G component existing in close proximity to an interpolation position. The interpolation processing is performed in the entire pixel area. The processing after the step S002 up to the step S011 is also performed in the entire pixel area. As a result, an image with a size of RAW data and having an intermittent array in which the other color is missing is obtained with the R components and the interpolated G components. Then, pixels having data are placed to the pixel positions of the missing parts, thereby creating a plane image having ¼ size of the RAW data with the R components and the interpolated G components (step S002). Although the R component and the G component are taken as an example, they may be the B component and the G component, and the order of processing (i.e. which of the R component and the B component is processed first) is arbitrary.

Then, (R+Interpolated G)/2 is calculated using the R component and the interpolated G component located in phase, thereby generating a false luminance signal (step S003). The false luminance signal is calculated in each of all pixel positions.

After that, high-pass filter processing (HPF) is performed on the false luminance signal in the radial direction with the optical axis at the center (pole), for example, and the absolute value of an HPF result is compared with a threshold for edge detection, thereby detecting a high-frequency component (edge) (step S004).

Then, a window of the G component is set with its center at the part including the high-frequency component (edge) detected in the above step S004. The window is a pixel area with finite vertical and horizontal lengths such as five pixels by five lines, for example. Further, a window of the R component having the same size as that of the G component is set. Then, the absolute value of a difference between the pixels located in the same coordinates in the G window and the R window is calculated sequentially while shifting in the radial direction, and all of the calculated absolute values are summed up (which is referred to hereinafter as SAD (Sum of Absolute Difference)). The SAD result is an indicator that indicates the correlation between the R window and the G window. Specifically, the correlation is lower as the SAD result is larger, and the correlation is higher as the SAD result is smaller. The SAD is calculated while shifting the R window in the radial direction as described above, and then the distance between the R window and the G window (the distance between the center of the R window and the center of the G window) with the smallest SAD result (i.e. the highest correlation) is detected as a color shift amount (step S005). This processing is performed with respect to each image height.

Then, the color shift amount obtained in the step S005 is normalized with respect to the distance at an image height of 100%, thereby calculating a scaling factor of the R component with respect to the G component at each image height (step S006). The result is a candidate of the chromatic difference of magnification of the G component with respect to the R component. This processing is performed with respect to each image height.

Next, the color shift amount detection processing in the step S005 and the scaling factor calculation processing in the step S006 are performed in various arbitrary radial directions (step S007). The arbitrary radial directions are preferably in a variety of directions in a well-balanced manner as much as possible in 360-degree directions, and the accuracy of a histogram, which is described later, becomes higher as the balance in directions is more even or the number of directions is larger.

Then, a histogram of the scaling factor is created for each image height based on the frequency of occurrence of candidates of the chromatic difference of magnification (scaling factors) obtained in the step S007 (step S008). The histogram shows the distribution of the frequency of occurrence of candidates of the chromatic difference of magnification. The mode of the histogram at each image height obtained in the step S008 is determined as the finally detected chromatic difference of magnification (step S009).

Then, color shift due to the chromatic difference of magnification of the R component is corrected at each image height by using the chromatic difference of magnification obtained in the step S009 (step S010). Because the chromatic difference of magnification obtained in the step S009 is the scaling factor of the R component with respect to the interpolated G component, the distance from the center of the image of the R component to be corrected is multiplied by the detected chromatic difference of magnification. The distance from the center of the image after correction is thereby obtained, and the pixel value of the R component located at the corrected distance is interpolated using the nearby located R component, thereby completing the correction of the chromatic difference of magnification of the R component.

After that, the steps S002 to S010 are performed on the B component in the same manner, thereby completing the correction of the chromatic difference of magnification of the B component (step S011).

(False Edge Detection Due to Fringe)

Fringe is described firstly. FIGS. 2A and 3A, and 2B and 3B are explanatory views showing the relationship between a lens and an imaging plane and the relationship between an imaging plane and a PSF, respectively.

Figure 2B:
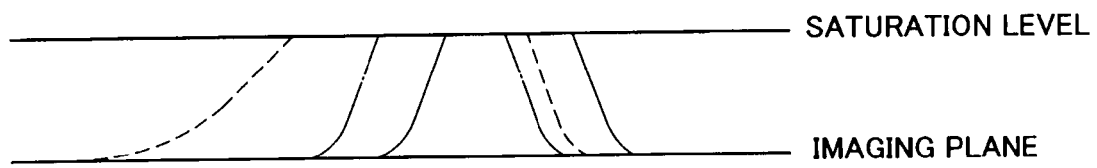

As shown in FIG. 2, the phenomenon that a color that spreads to the nearby pixel by the point spread function (PSF) (which is described later) leaks out over a large pixel area, causing false color, color shift and color oozing to occur in the peripheral part, is called the fringe. FIGS. 2A and 2B show an example where the image focus locations of the R, G and B components shift from one another. As shown in FIGS. 2A and 2B, the phenomenon that colors shift is called the chromatic difference of magnification. The fringe is the phenomenon which can occur even when the chromatic difference of magnification is not occurring.

Figure 3A:
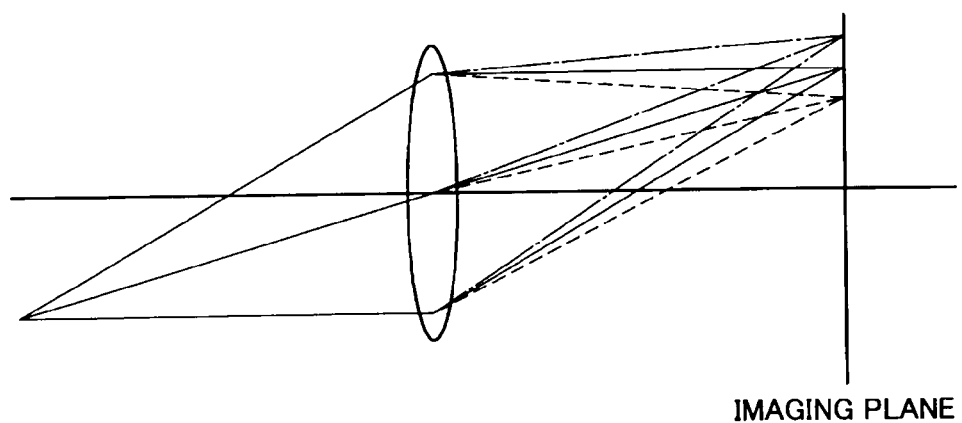
FIGS. 3A and 3B are explanatory views showing the relationship between a lens and an imaging plane and the relationship between an imaging plane and a PSF, respectively.
Figure 3B:
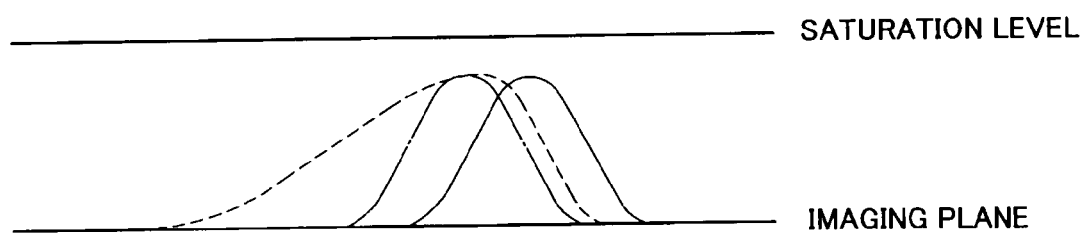

Further, the fringe is the phenomenon which can occur regardless of the saturation state of each color as shown in FIGS. 3A and 3B. The fringe is likely to occur when a luminance value is saturated in a pixel with an upper luminance value in an edge portion. However, the fringe occurs regardless of the saturation state of a luminance value. If the fringe occurs, the frequency characteristics of the edge portion are degraded, which causes a decrease in the accuracy of edge detection.

Further, the amount of occurrence of the fringe is larger as the edge strength is higher. This is because, as the edge strength is higher, the spreading of the PSF extends over a wider range, so that the range of the base of the spread becomes larger. The edge strength is a difference in luminance value between adjacent pixels.

Furthermore, the amount of occurrence of the fringe is larger as the image height is larger. This is because, as the image height is larger, the spreading of the PSF extends over a wider range and the shift of an image focus location increases, so that the range where the base of the spread is visible becomes larger. The image height is the distance from the center of the optical axis in an image.

The PSF is described hereinafter. FIG. 4 is an explanatory view showing the relationship of a point light source 10, a lens 114, a point image 12 on an image pickup device 101 and a PSF 14.

As shown in FIG. 4, the accuracy of an optical lens is represented using the point spread function (PSF), for example.

The point spread function a representation of the degree of blurring of an image by an optical lens when taking a picture of a point object, and it is a function that indicates the intensity distribution when blurring. The point spread function is a function that represents the way a light beam spreads when an ideal point image passes through an optical system.

The point means a delta function of Dirac. In discrete signal processing, it is preferred that the size when a resolution of an image pickup device on an image pickup plane is mapped onto the object space is sufficiently small. Mathematically, it is known to be represented as:

$$a * e^{-2(x/\sigma)(x/\sigma)}$$

where x: distance (mm), σ: spread (mm), a: normalization constant

Figure 10B:
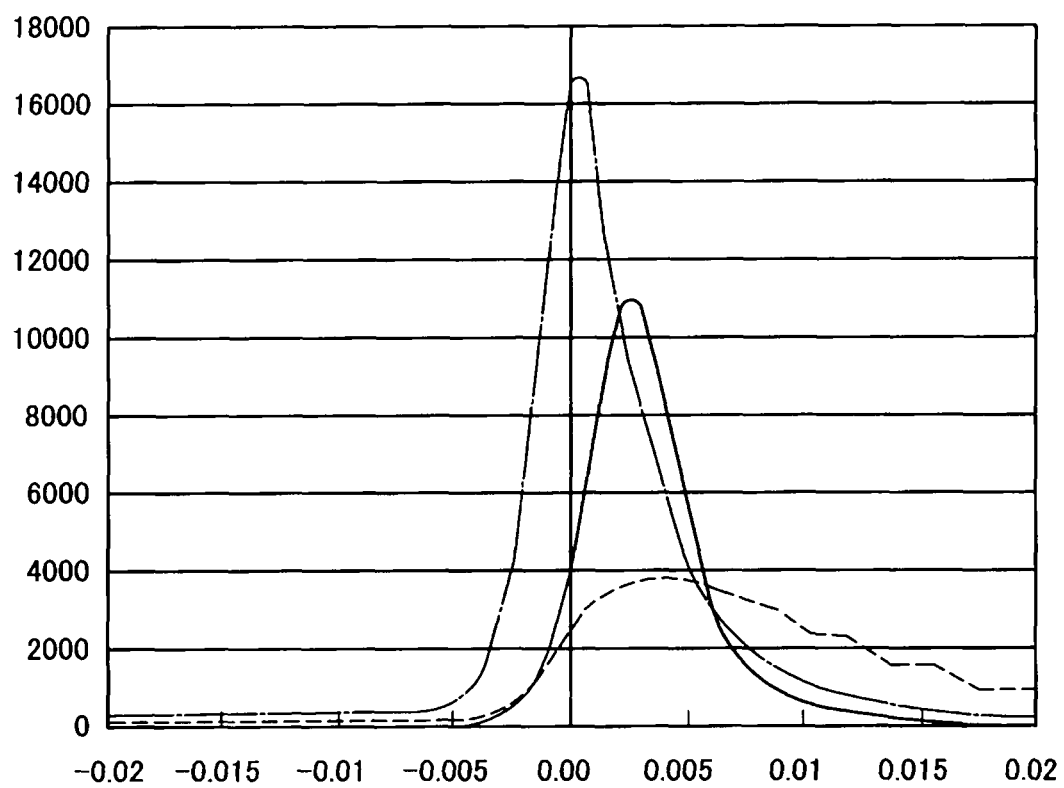
FIG. 10B is a graph showing a point spread function.

Further, as shown in FIGS. 10A and 10B, the PSF has characteristics that, as the image height is larger, the degree of spreading of a color increases, so that the shift of an image focus location becomes larger. FIGS. 10A and 10B are graphs showing the point spread function. The upper graph of FIG. 10A shows the PSF on the optical axis, the lower graph of FIG. 10A shows the PSF at an image height of 50%, and the graph of FIG. 10B shows the PSF at an image height of 100%. In those graphs, the alternate long and short dashed line indicates the Green component, the full line indicates the Red component, and the broken line indicates the Blue component.

The above distance x can be converted into the number of pixels if the specifications of the image pickup device such as the pixel pitch or the distance from the lens are known. Thus, in the degree of spreading of the PSF, the distance x is hereinafter treated as the equivalent number of pixels.

A first example for preventing the degradation of the edge detection accuracy due to the fringe is described hereinbelow.

In the first example, the saturation state of a luminance value is referred to firstly on the ground of characteristics that the fringe is likely to occur at an edge where a luminance value is saturated.

Figure 5A:
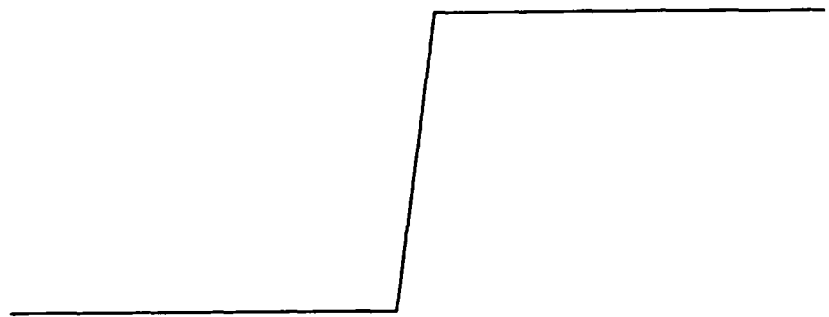
FIGS. 5A and 5B are explanatory views showing the level of a luminance signal.
Figure 5B:
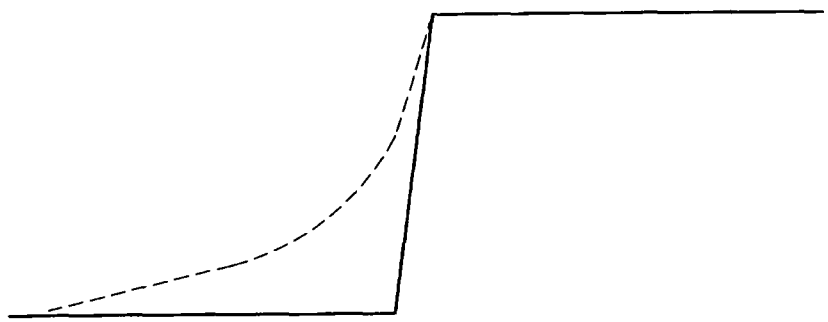

When performing edge detection of a false luminance signal, it is determined whether the upper false luminance signal level is saturated in the position determined to be an edge as shown in FIG. 5A. FIGS. 5A and 5B are explanatory views showing the level of a luminance signal.

If the edge of the false luminance signal is generated due to a difference in luminance value as shown in FIG. 5A, if the upper false luminance signal level is saturated in the adjacent pixels, there is a high possibility that the fringe as shown in the dotted line of FIG. 5B occurs.

Thus, in this embodiment, processing for disabling the detection of the chromatic difference of magnification is performed in the edge where saturation occurs, so that the edge is not used for the detection of the chromatic difference of magnification. Whether the edge is saturated or not may be determined by referring to the level of the false luminance signal on the upper side of the edge and determining whether it is at the maximum level or near the maximum level as shown in FIG. 5A, for example. If the level of the false luminance signal is at the maximum level or near the maximum level, the detection processing of the chromatic difference of magnification is not performed, or the processing is disabled, in the edge after that.

Although the false luminance signal is generated by (R(or B)+Interpolated G)/2 in this embodiment, the present invention is not limited thereto. For example, a result of calculation using the R (or B) component and the interpolated G component may be used as the false luminance signal. Alternatively, the interpolated G component may be used as the false luminance signal.

Figure 19:
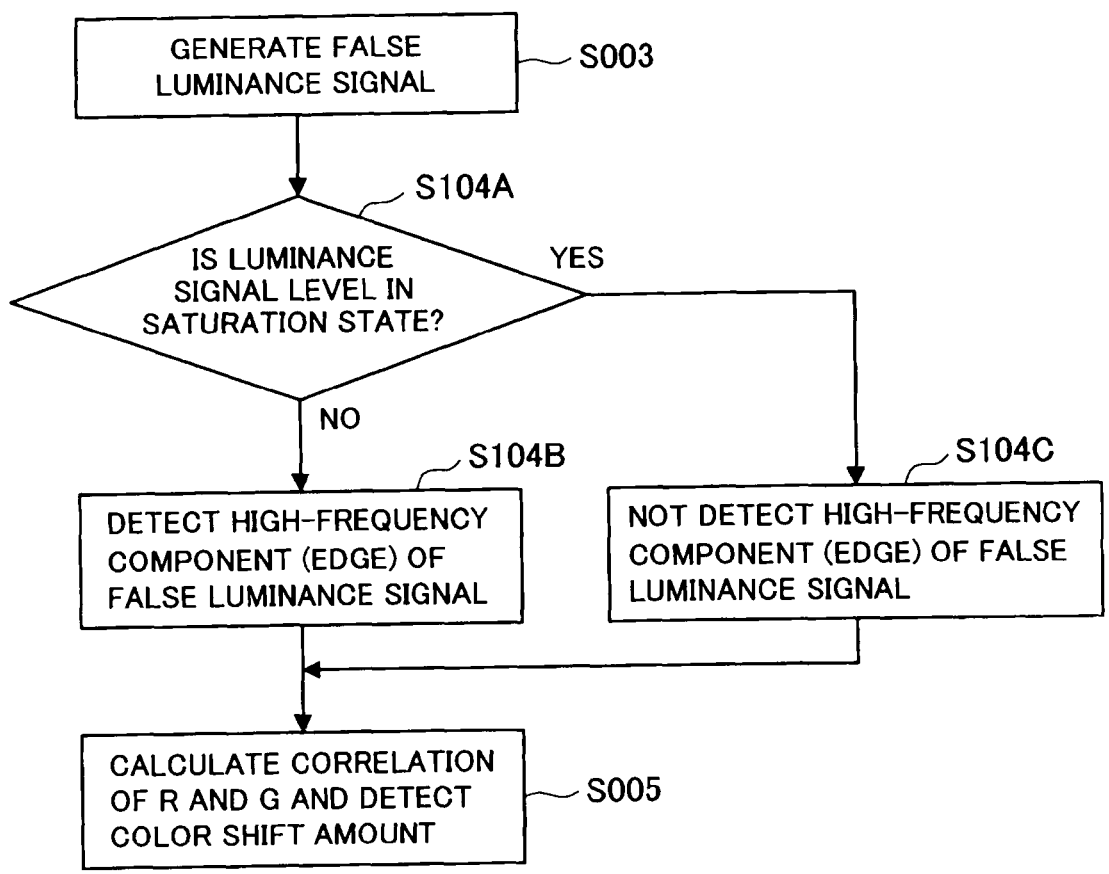
FIG. 19 is a flowchart showing an operation for detection and correction of chromatic difference of magnification.

FIG. 19 is a flowchart showing the above-described processing. This is improved processing of the step S004 in FIG. 18. Thus, the start of FIG. 19 is the output of the step S003 in FIG. 18, and the end of FIG. 19 is the input of the step S005 in FIG. 18.

First, the false luminance signal generated in the step S003 is input, and it is determined whether the level of the input false luminance signal is saturated or not, or nearly saturated or not (step S104A).

If the input false luminance signal level is not saturated or not nearly saturated, HPF is performed on the false luminance signal in the radial direction. Then, the absolute value of an HPF result is compared with a threshold for edge detection, thereby detecting an edge (step S104B).

On the other hand, if the input false luminance signal level is saturated or nearly saturated, edge detection is not performed on the false luminance signal (step S104C). By using the edge detection result obtained in the steps S104B and S104C as described above, a color shift amount is detected in the step S005.

Next, a second example for preventing the degradation of the edge detection accuracy due to the fringe is described hereinbelow.

In the first example, processing about an edge where a luminance level is saturated is described. In the second example, on the other hand, processing on the luminance edge is performed regardless of whether the luminance level is saturated.

Figure 11:
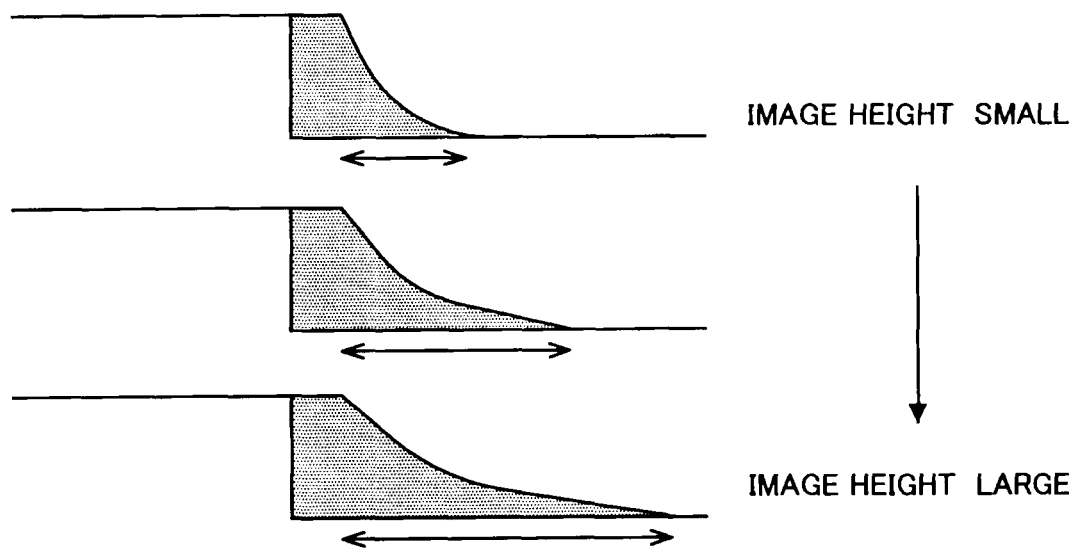
FIG. 11 is an explanatory view showing the level of a luminance signal.

As shown in FIG. 11, if the edge strength is the same, the fringe extends more widely as the image height becomes larger. Accordingly, the area where a false color is generated becomes larger. FIG. 11 is an explanatory view showing the level of a luminance signal. Although FIG. 11 shows the case where the luminance level is saturated, this is the same in the state where the luminance level is not saturated. This is because the false color range by the PSF increases as the image height becomes larger. By using a technique of making the above range likely to be excluded from the detection of the chromatic difference of magnification, it is possible to further improve the detection accuracy compared to the first example.

As shown in the step S104B, edge detection is performed by performing HPF on the false luminance signal and comparing an HPF result with a threshold. If the HPF result is larger than the threshold, it can be determined as being a high-frequency component, and edge detection is made upon determination as being a high-frequency component.

Although the threshold is a fixed value in the first example, the threshold is varied according to the size of the image height in the second example. For example, if the threshold in the first example is TH1 and the image height is R, the threshold TH2 that is varied according to the image height can be represented by the following expression, for example:

$$TH2 = TH1 \times (1+R) + \text{OFST(offset)}$$

Figure 6A:
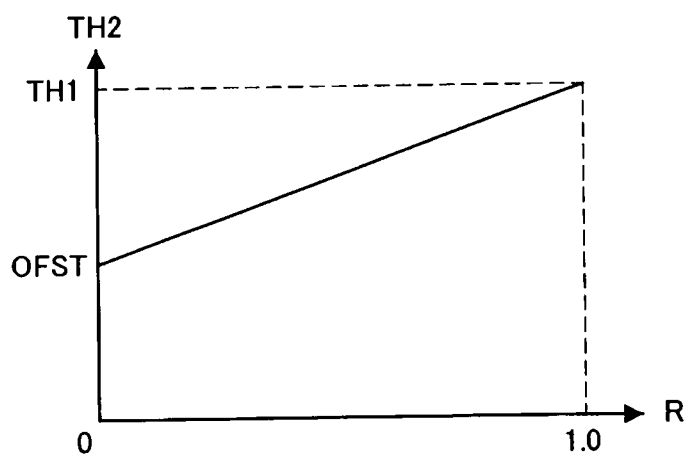
FIGS. 6A to 6C are graphs showing the relationship between a threshold and an image height.
Figure 6B:
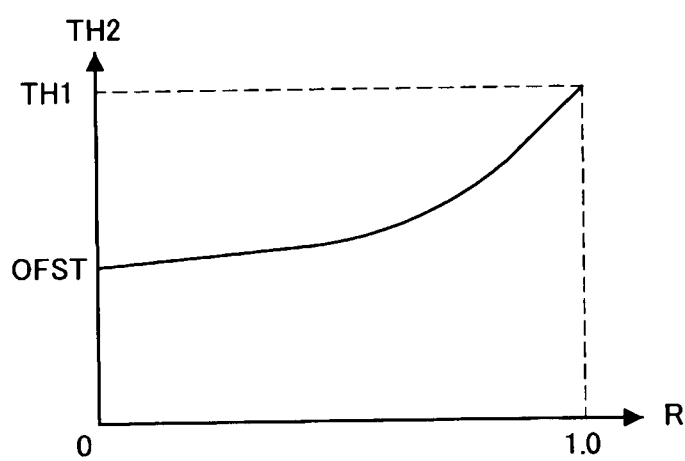
Figure 6C:
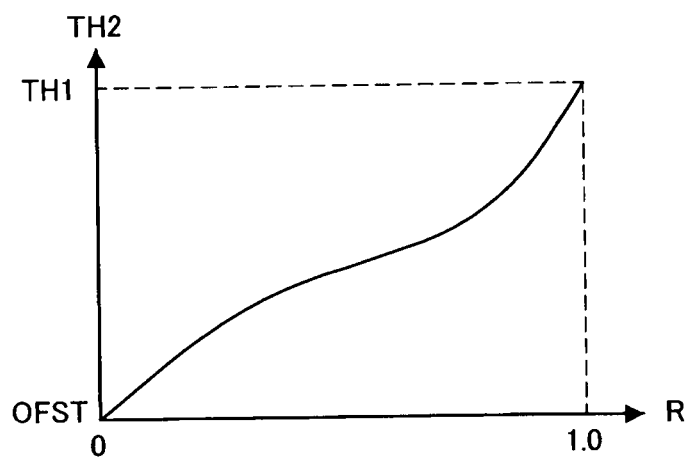

In this example, the image height is normalized, $0 \leq R \leq 1$, and R has several decimal digits of accuracy. Further, $0 \leq \text{OFST} \leq TH1$, and OFST also has several decimal digits of accuracy. This is an example where the threshold TH2 is varied linearly with respect to a change in image height as shown in FIG. 6A, and the edge detection that eliminates the effect of the fringe can be performed as the image height becomes larger. FIGS. 6A to 6C are graphs showing the relationship between the threshold and the image height.

FIGS. 6B and 6C show an example where the threshold TH2 is varied non-linearly with respect to a change in image height. By setting the threshold TH2 with respect to the image height in a non-linear manner according to the characteristics of the lens, it is possible to use the threshold TH2 that is optimized for the characteristics specific to the lens. As the characteristics specific to the lens, information prestored in a storage medium such as memory may be used. Alternatively, in the case where an exchangeable lens is used, for example, the lens may store the specific information, and the signal processing unit may obtain the information and thereby set the threshold with respect to the image height.

Figure 20:
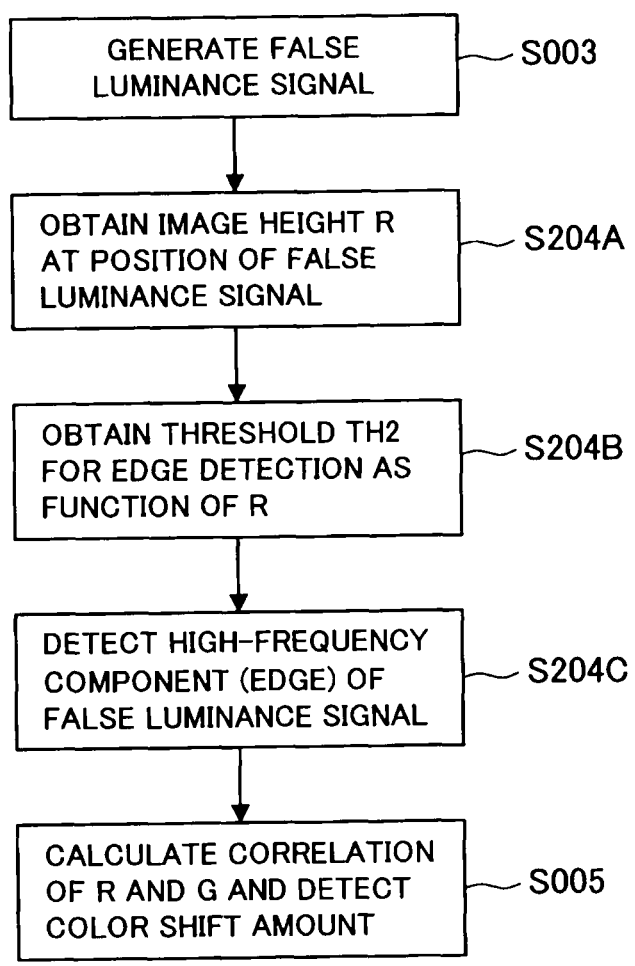
FIG. 20 is a flowchart showing an operation for detection and correction of chromatic difference of magnification.

FIG. 20 is a flowchart showing the above processing.

This is improved processing of the step S004 in FIG. 18. Thus, the start of FIG. 20 is the output of the step S003 in FIG. 18, and the end of FIG. 20 is the input of the step S005 in FIG. 18.

First, the false luminance signal generated in the step S003 is input, and the image height R is obtained from the coordinates at which the input false luminance signal is located (step S204A).

With use of the image height R obtained in the step S204A, the threshold TH2 for edge detection is obtained as a function of R (step S204B). This is the processing such that the threshold TH2 increases as the image height becomes larger, for example.

Next, HPF is performed on the false luminance signal in the radial direction. The absolute value of an HPF result is compared with the threshold TH2 for edge detection obtained in the step S204B, thereby detecting an edge (step S204C). By using the edge detection result obtained in the step S204C as described above, a color shift amount is detected in the step S005.

A third example for preventing the degradation of the edge detection accuracy due to the fringe is described hereinbelow.

In the third example, processing on the luminance edge is performed regardless of whether the luminance level is saturated, as in the second example.

Figure 12:
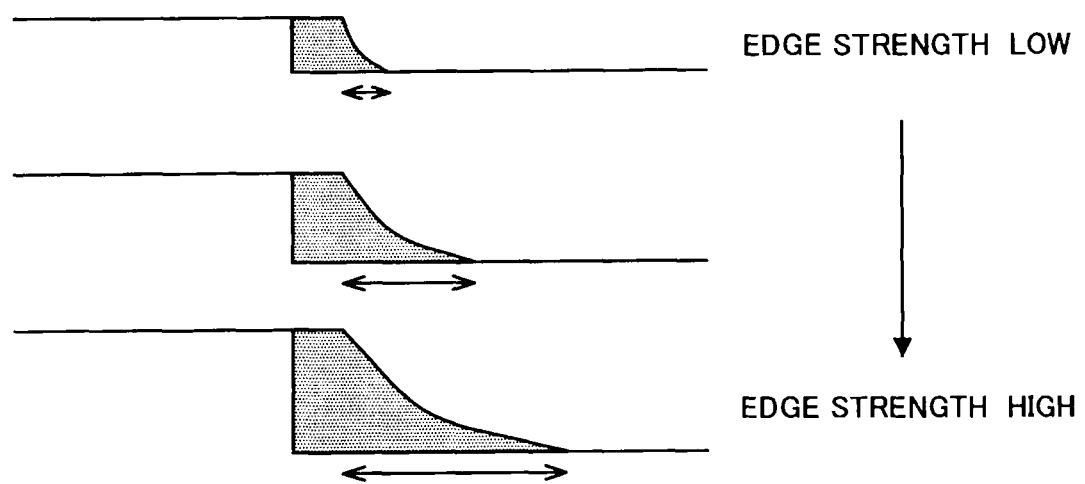
FIG. 12 is an explanatory view showing the level of a luminance signal.

As shown in FIG. 12, if the image height is the same, the fringe extends more widely as the edge strength becomes higher. Accordingly, the area where a false color is generated becomes larger. FIG. 12 is an explanatory view showing the level of a luminance signal. Although FIG. 12 shows the case where the luminance level is saturated, this is the same in the state where the luminance level is not saturated. This is because the false color range by the PSF increases as the edge strength becomes higher. By using a technique of making the above range likely to be excluded from the detection of the chromatic difference of magnification, it is possible to further improve the detection accuracy compared to the first example.

As shown in the step S104B, the edge detection is performed by performing HPF on the false luminance signal and comparing an HPF result with a threshold. If the HPF result is larger than the threshold, it can be determined as being a high-frequency component, and edge detection is made upon determination as being a high-frequency component.

Although the threshold is a fixed value in the first example, the threshold is varied according to the value of the edge strength in the third example.

For example, if the threshold in the first example is TH1 and the edge strength is |HPF|, the threshold TH2 that is varied according to the edge strength can be represented by the following expression, for example:

$$TH2 = TH1 \times (1+|HPF|) + \text{OFST}$$

Figure 7A:
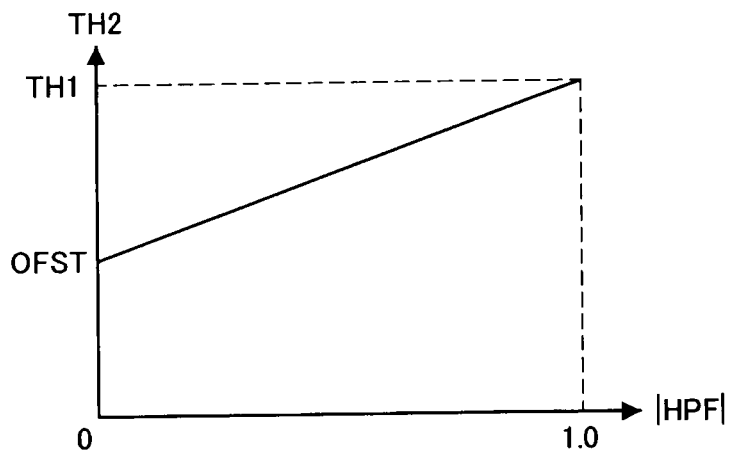
FIGS. 7A to 7C are graphs showing the relationship between a threshold and |HPF|.
Figure 7B:
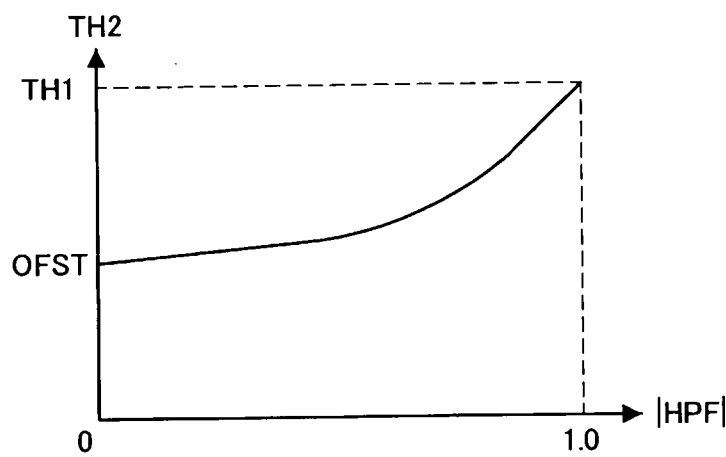
Figure 7C:
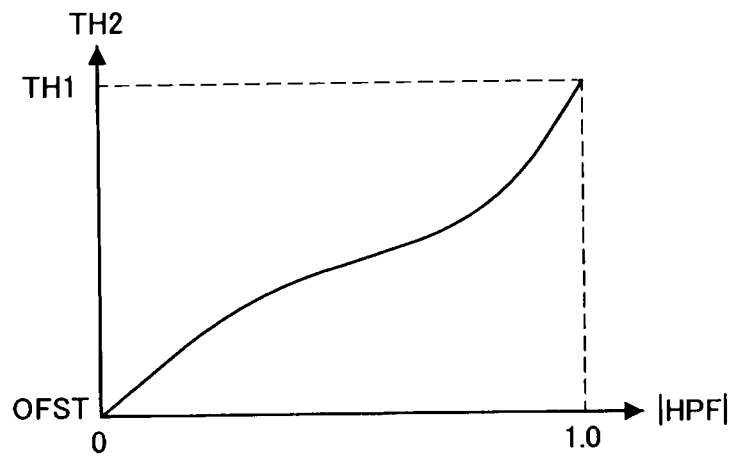

In this example, the edge strength is normalized, $0 \leq |HPF| \leq 1$, and |HPF| has several decimal digits of accuracy. Further, $0 \leq \text{OFST} \leq TH1$, and OFST also has several decimal digits of accuracy. This is an example where the threshold TH2 is varied linearly with respect to a change in edge strength as shown in FIG. 7A, and the edge detection that eliminates the effect of the fringe can be performed as the edge strength becomes higher. FIGS. 7A to 7C are graphs showing the relationship between the threshold and |HPF|.

FIGS. 7B and 7C show an example where the threshold TH2 is varied non-linearly with respect to a change in edge strength. By setting the threshold TH2 with respect to the edge strength in a non-linear manner according to the characteristics of the lens, it is possible to use the threshold TH2 that is optimized for the characteristics specific to the lens. As the characteristics specific to the lens, information prestored in a storage medium such as memory may be used. Alternatively, in the case where an exchangeable lens is used, for example, the lens may store the specific information, and the signal processing unit may obtain the information and thereby set the threshold with respect to the edge strength.

Figure 21:
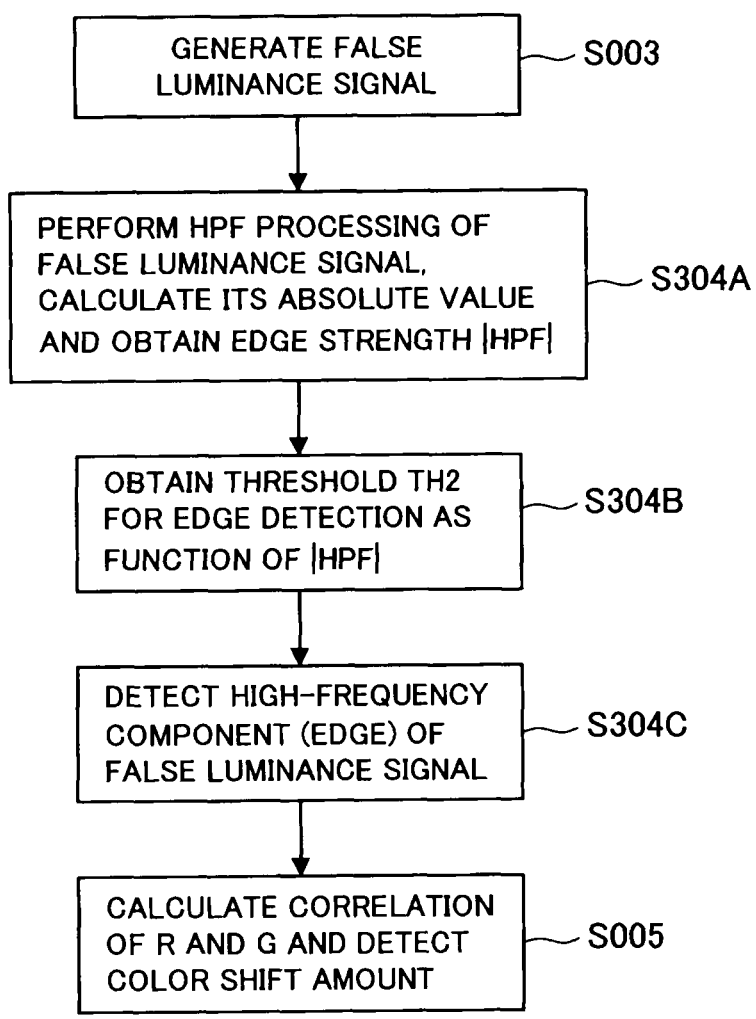
FIG. 21 is a flowchart showing an operation for detection and correction of chromatic difference of magnification.

FIG. 21 is a flowchart showing the above processing.

This is improved processing of the step S004 in FIG. 18. Thus, the start of FIG. 21 is the output of the step S003 in FIG. 18, and the end of FIG. 21 is the input of the step S005 in FIG. 18.

First, the false luminance signal generated in the step S003 is input, HPF is performed on the input false luminance signal, and the absolute value of an HPF result is calculated, thereby obtaining the edge strength |HPF| (step S304A).

With use of the edge strength |HPF| obtained in the step S304A, the threshold TH2 for edge detection is obtained as a function of |HPF| (step S304B). This is the processing such that the threshold TH2 increases as the edge strength becomes larger, for example.

Next, HPF is performed on the false luminance signal in the radial direction. The absolute value of an HPF result is compared with the threshold TH2 for edge detection obtained in the step S304B, thereby detecting an edge (step S304C). By using the edge detection result obtained in the step S304C as described above, a color shift amount is detected in the step S005.

Further, by implementing the first example, the second example and the third example described above all together, it is possible to obtain the advantages of the three examples at the same time. Further, any two examples out of the three examples may be selected for implementation.

Figure 22A:
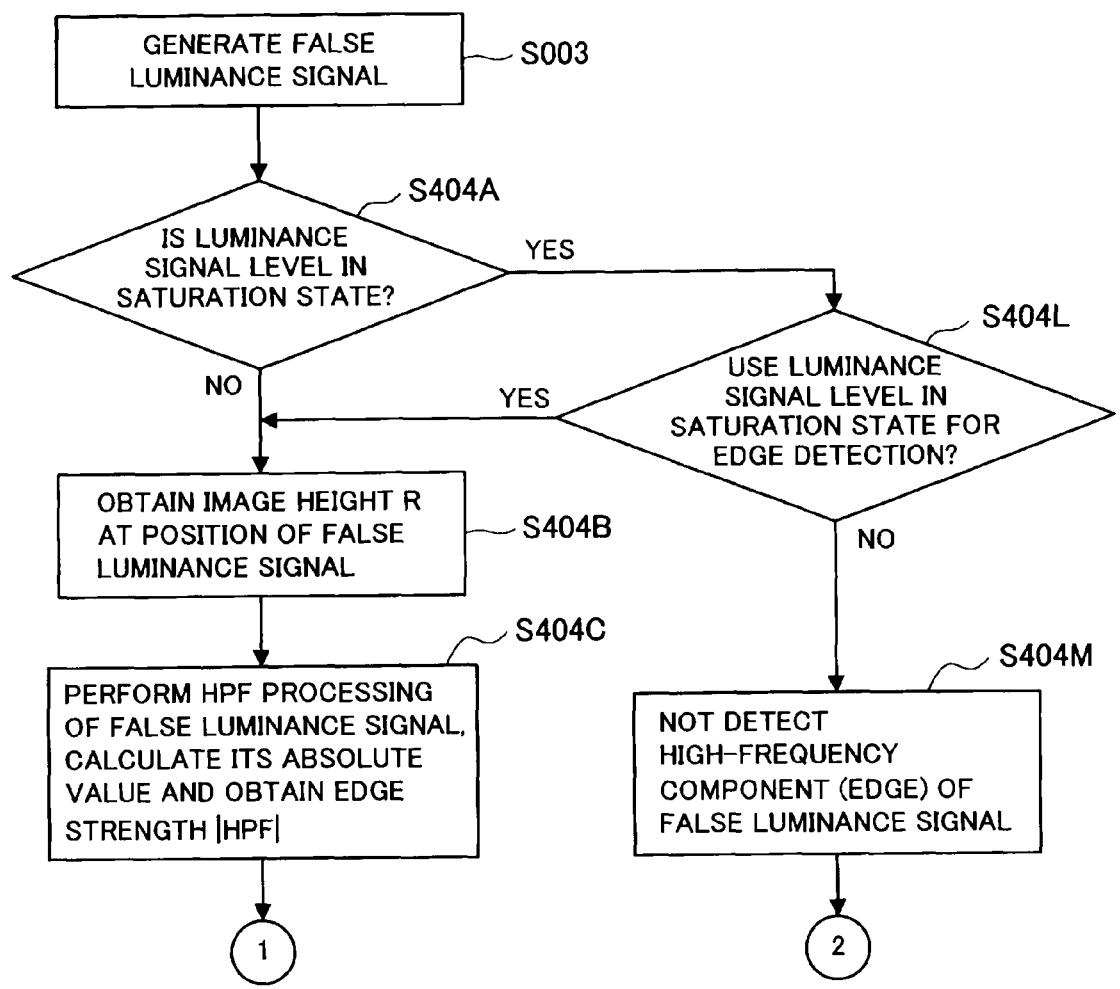
FIG. 22A is a flowchart showing an operation for detection and correction of chromatic difference of magnification.
Figure 22B:
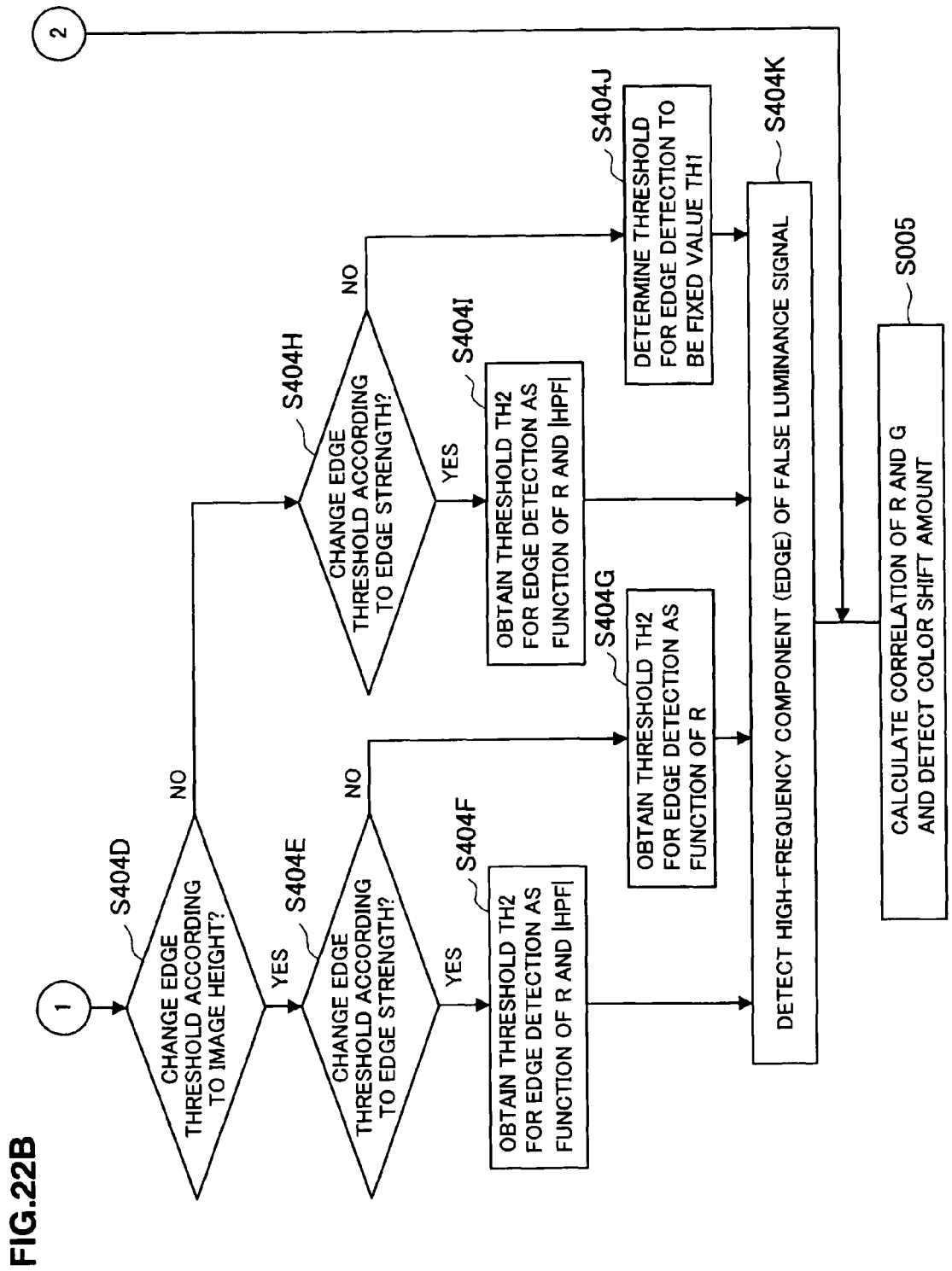
FIG. 22B is a flowchart showing an operation for detection and correction of chromatic difference of magnification.

FIGS. 22A and 22B show the flow in the case of implementing the first, second, and third examples as shown in the flowcharts of FIGS. 19, 20 and 21, respectively, all together.

This is improved processing of the step S004 in FIG. 18. Thus, the start of FIG. 22 is the output of the step S003 in FIG. 18, and the end of FIG. 22 is the input of the step S005 in FIG. 18.

First, the false luminance signal generated in the step S003 is input, and it is determined whether the level of the input false luminance signal is saturated or not, or nearly saturated or not (step S404A).

Next, the false luminance signal which is determined in the step S404A that the false luminance signal level is not saturated or not nearly saturated is input, and the image height R is obtained from the coordinates at which the input false luminance signal is located (step S404B). Alternatively, the false luminance signal which is determined in the step S404L, which is described later, that it is the luminance signal at the saturation level or near the saturation level but used for edge detection is input, and the image height R is obtained from the coordinates at which the input false luminance signal is located (step S404B).

Then, the false luminance signal that is output in the step S404B is input, HPF is performed on the input false luminance signal, and the absolute value of an HPF result is calculated, thereby obtaining the edge strength |HPF| (step S404C). Next, it is determined whether to vary a threshold for edge detection (which is referred to hereinafter also as an edge threshold) according to the image height (step S404D).

If it is determined that the edge threshold is varied according to the image height, it is further determined whether to change the edge threshold according to the edge strength also (step S404E).

If it is determined in the step S404D and the step S404E that the edge threshold is varied according to both the image height and the edge strength, the threshold TH2 for edge detection is obtained as a function of R and |HPF|. On the the other hand, if it is determined in the step S404D and the step S404E that the edge threshold is varied according to the image height only, the threshold TH2 for edge detection is obtained as a function of R (step S404G).

If it is determined in the step S404D that the edge threshold is not varied according to the image height, it is further determined whether to change the edge threshold according to the edge strength (step S404H). If it is determined in the step S404D and the step S404H that the edge threshold is varied according to the edge strength only, the threshold TH2 for edge detection is obtained as a function of |HPF| (step S404I). Further, if it is determined in the step S404D and the step S404H that the edge threshold is not varied according to any of the image height and the edge strength, the threshold TH1 for edge detection is obtained as a fixed value (step S404J).

Then, HPF is performed on the false luminance signal in the radial direction. The absolute value of an HPF result is compared with the threshold TH2 for edge detection obtained in the step S404F, S404G or S404I, or the threshold TH1 for edge detection obtained in the step S404J, thereby detecting an edge (step S404K). Referring back to FIG. 22A, the false luminance signal which is determined in the step S404A that it is at the saturation level or near the saturation level is input, and it is determined whether edge detection is performed on the input false luminance signal (step S404L).

The false luminance signal which is determined in the step S404L that it is not used for edge detection because it is at the saturation level or near the saturation level is excluded from an edge detection target, and the edge detection is not performed on the false luminance signal (step S404M).

By using the edge detection result obtained in the step S404K or S404M as described above, a color shift amount is detected in the step S005.

A fourth example for preventing the degradation of the edge detection accuracy due to the fringe is described hereinbelow.

As described earlier, due to the spreading at the pixel level by the PSF, the fringe occurs in such a way that the region where a false color is generated becomes wider as the image height becomes larger. In the fourth example, a region to be excluded from edge detection is determined in consideration of the characteristics specific to the lens, thereby improving the detection accuracy of the color shift amount. This is described hereinbelow.

First, information specific to the lens is stored in a storage medium in advance. The information specific to the lens is pixel level spread information by the PSF at each image height. For example, as shown in FIGS. 10A and 10B, the PSF has characteristics that the degree of spreading of a color increases as the image height becomes larger, resulting in generation of a false color over a wide range. Because the false color generation range is obtained from the PSF information as shown in FIGS. 10A and 10B, the PSF information is stored in advance. The PSF information is known information as design data of the lens.

Figure 8:
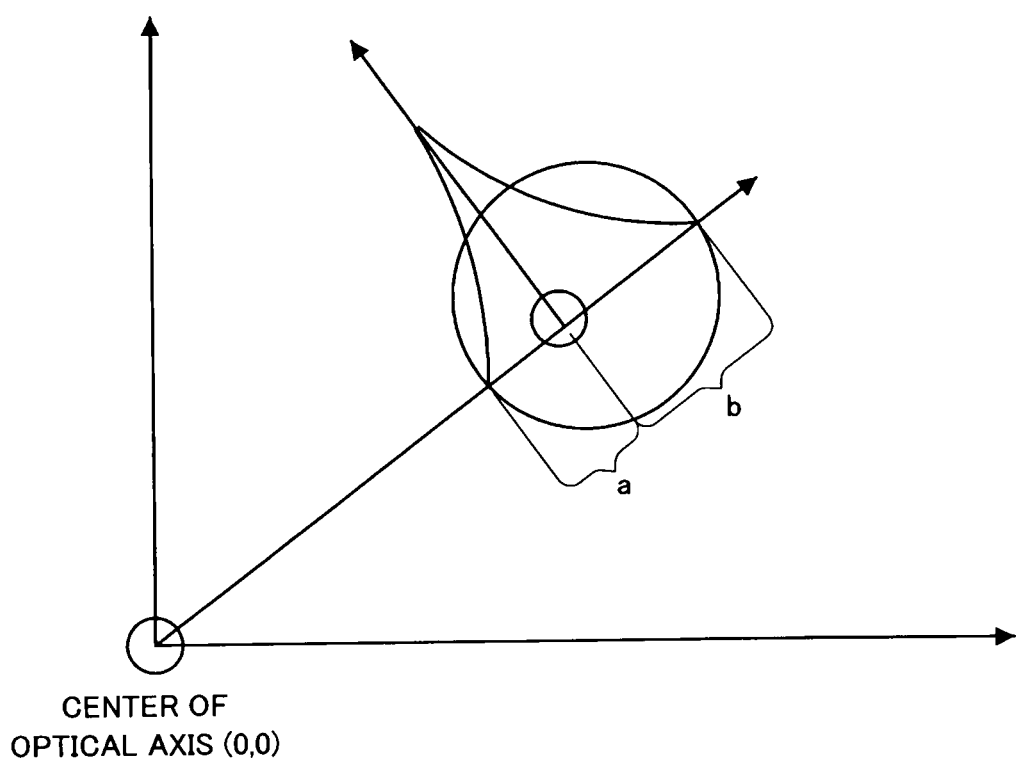
FIG. 8 is an explanatory view showing an image pickup plane and a PSF.

FIG. 8 shows an example of a region to be excluded from edge detection in the position at an image height of 50%. FIG. 8 is an explanatory view showing the image pickup plane and the PSF.

This example shows an excluded region in the case where, with respect to the false luminance signal in the position at an image height of 50%, the peripheral pixels are excluded from an edge detection target, regardless of whether the false luminance signal is saturated or not. The same concept is applied to another image height as well.

For example, a false color is generated in the region indicated by the circle (ellipse) due to the PSF in the position at an image height of 50% as shown in FIG. 8. Thus, in the fourth example, edge detection is not performed inside the circle where the false color is generated. However, because a spread region exists generally at any image height in the PSF, if the exclusion of the false color region as shown in FIG. 8 is applied to the whole image area, there becomes no edge detection target as a result. It is thus preferred to impose some constraints on the excluded region.

For example, it is preferred to multiply spread lengths a and b in FIG. 8 by an image height rate or the like and calculate new spread lengths a' and b' as follows and apply them:

$$a' = a \times R$$

$$b' = b \times R$$

where $0 \leq R \leq 1$, and R has several decimal digits of accuracy. It is thereby possible to exclude the edge detection in the range of the false color due to the fringe which is highly visible in the position at a large image height and obtain an appropriate edge detection region according to the image height. The calculation of the above values a' and b' is not limited the above example, and the values may be altered according to the edge strength described above, for example, other than the image height.

As described above, it is possible to perform the edge detection that eliminates the effect of the fringe in consideration of the PSF, the image height, the edge strength or the like.

Figure 9:
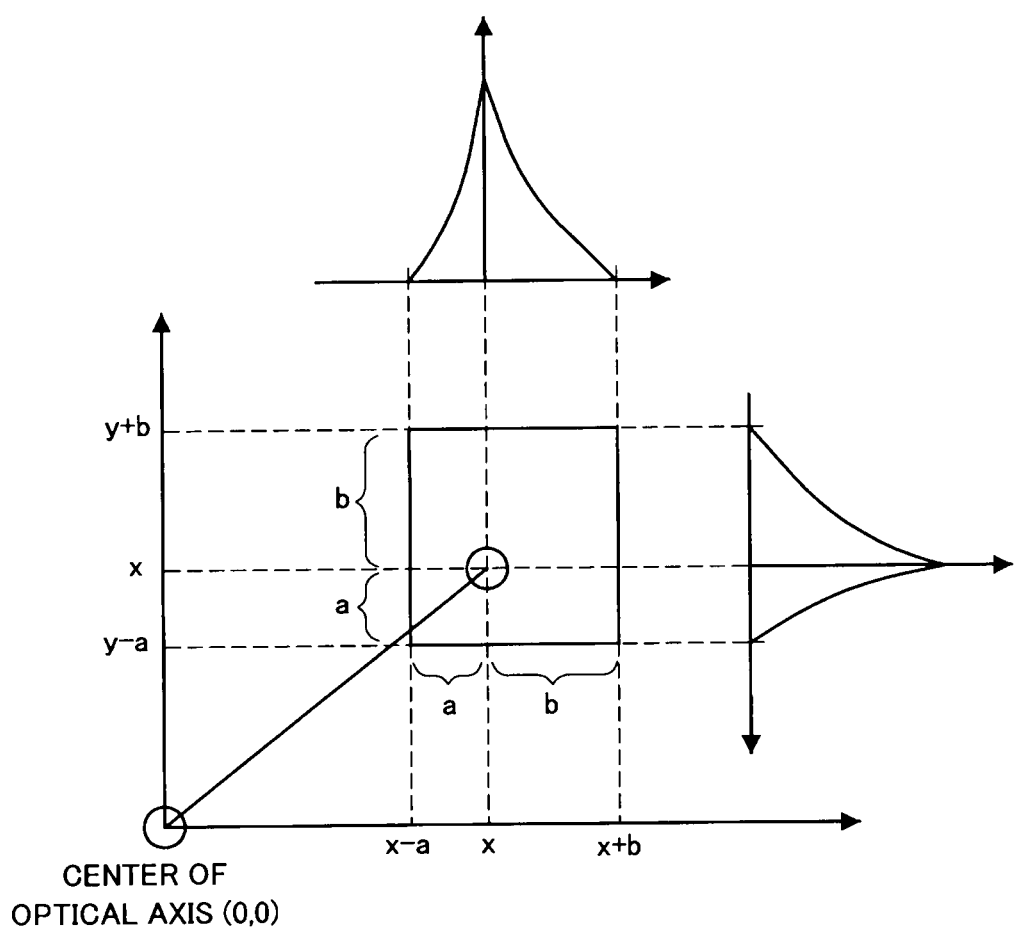
FIG. 9 is an explanatory view showing an image pickup plane and a PSF.

Further, regarding the above-described fourth example, the region where edge detection is disabled may be set more easily in practice by constraints of a signal processing circuit scale, DSP processing time or the like. FIG. 9 is an explanatory view showing the image pickup plane and the PSF.

In this example, it is assumed that the false color is generated by the PSF in the position at an image height of 50% in the region of:

horizontal start position: x−a
horizontal end position: x+b
vertical start position: y−a
vertical end position: y+b as shown in FIG. 9, and detection is not performed in this region.

However, because a spread region exists generally at any image height in the PSF as described earlier, if the exclusion of the false color region as shown in FIG. 9 is applied to the whole image area, there becomes no edge detection target as a result. It is thus preferred to impose some constraints on the excluded region.

For example, it is preferred to multiply spread lengths a and b in FIG. 9 by an image height rate or the like and calculate new spread lengths a' and b' as follows and apply them:

$$a' = a \times R$$

$$b' = b \times R$$

where $0 \leq R \leq 1$, and R has several decimal digits of accuracy. It is thereby possible to exclude the edge detection in the range of the false color due to the fringe which is highly visible in the position at a large image height and obtain an appropriate edge detection region according to the image height. The calculation of the above values a' and b' is not limited the above example, and the values may be altered according to the edge strength described above, for example, other than the image height.

As described above, it is possible to perform the edge detection that eliminates the effect of the fringe in consideration of the PSF, the image height, the edge strength or the like.

Figure 23:
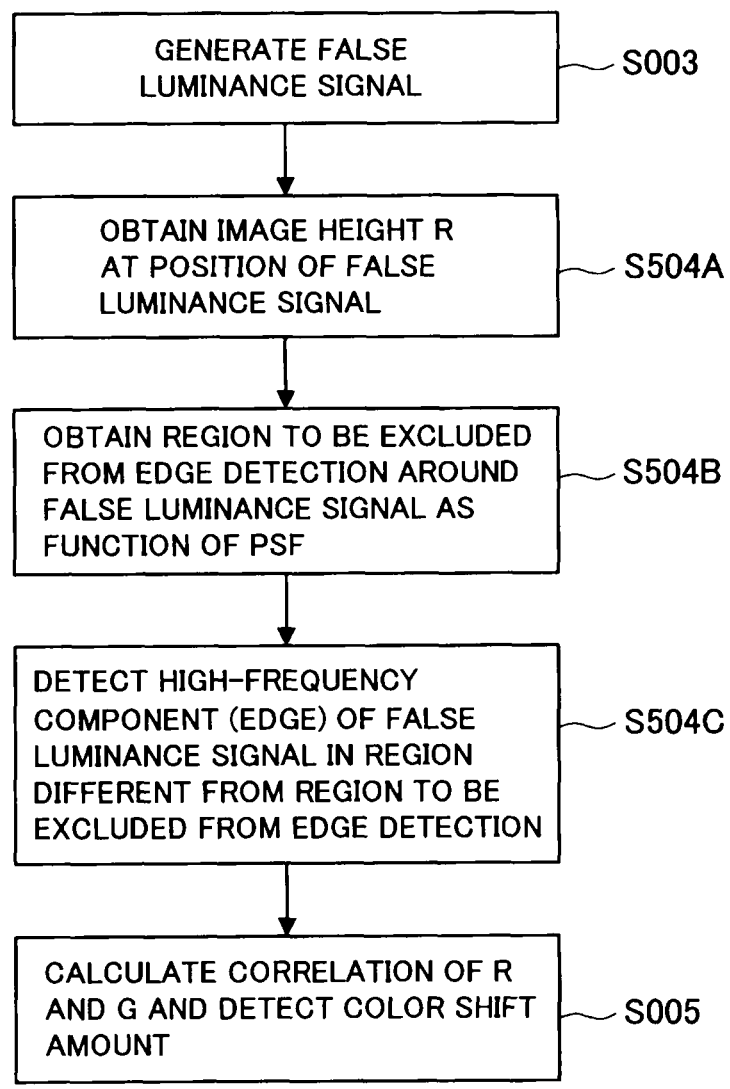
FIG. 23 is a flowchart showing an operation for detection and correction of chromatic difference of magnification.

FIG. 23 shows the flow of the above-described processing.

This is improved processing of the step S004 in FIG. 18. Thus, the start of FIG. 23 is the output of the step S003 in FIG. 18, and the end of FIG. 23 is the input of the step S005 in FIG. 18.

First, the false luminance signal generated in the step S003 is input, and the image height R is obtained from the coordinates at which the input false luminance signal is located (step S504A).

With use of the image height R obtained in the step S504A, a region to be excluded from edge detection is obtained as a function of PSF (step S504B).

Then, the high-frequency component (edge) of the false luminance signal is detected in a region different from the region to be excluded from edge detection (step S504C).

By using the edge detection result obtained in the step S504C as described above, a color shift amount is detected in the step S005.

When acquiring the information specific to the lens, if the lens is exchangeable, PSF information or information corresponding to PSF information that is stored in ROM of the lens unit is acquired. It is thereby possible to take the characteristics specific to the lens into consideration. If, on the other hand, the lens is not exchangeable, PSF information or data corresponding to PSF information is prestored as known information in a storage medium of the signal processing unit. It is thereby possible to take the characteristics specific to the lens into consideration.

Advantages of the Embodiment

1. Edge detection is not performed in the region of the false luminance signal where the luminance level is near the saturation level, which is the fringe occurring region (the false color region due to spreading at the pixel level by the PSF), so that an edge to be used for edge detection can be determined appropriately. It is thereby possible to exclude the fringe that is obviously expected to occur at the saturated edge from the detection region, thus enabling the detection of the chromatic difference of magnification without degradation of the detection accuracy due to the adverse effects of the deterioration of edge frequency characteristics or the false color caused by the fringe.

2. The threshold for edge detection is varied according to the image height regardless of whether the luminance level is saturated or not, so that an edge to be used for detection can be determined appropriately. It is thereby possible to exclude the fringe to occur on the periphery of the edge from the detection region according to the image height, thus enabling the detection of the chromatic difference of magnification without degradation of the detection accuracy due to the adverse effects of the deterioration of edge frequency characteristics or the false color caused by the fringe that extends more widely as the image height becomes larger.

3. The threshold for edge detection is varied according to the edge strength regardless of whether the luminance level is saturated or not, so that an edge to be used for detection can be determined appropriately. It is thereby possible to exclude the fringe to occur on the periphery of the edge from the detection region according to the edge strength, thus enabling the detection of the chromatic difference of magnification without degradation of the detection accuracy due to the adverse effects of the deterioration of edge frequency characteristics or the false color caused by the fringe that extends more widely as the edge strength becomes larger.

4. The first to third examples are concurrently and selectively implemented. Specifically, it is designed to selectably perform an operation to disable the edge detection in the edge where the luminance level is near the saturation level and an operation to vary the threshold for edge detection according to the image height or the edge strength regardless of whether the luminance level is saturated or not. It is thereby possible to exclude the fringe to occur on the periphery of the saturated edge from the detection region, so that the fringe to occur on the periphery of all edges can be excluded from the detection region according to the image height or the edge strength. This enables the detection of the chromatic difference of magnification without degradation of the detection accuracy due to the adverse effects of the deterioration of edge frequency characteristics or the false color caused by the fringe that is obviously expected to occur at the saturated edge and the fringe that extends more widely as the image height or the edge strength becomes higher.

5. The region where the edge detection is performed is determined in consideration of the characteristics (PSF) specific to the lens regardless of whether the luminance level is saturated or not, so that an edge to be used for detection can be determined appropriately. It is thereby possible to exclude the fringe to occur on the periphery of the edge from the detection region according to the PSF, thus enabling the detection of the chromatic difference of magnification without degradation of the detection accuracy due to the adverse effects of the deterioration of edge frequency characteristics or the false color caused by the fringe that extends more widely as the image height becomes larger.

6. It is actually preferred to suppress the chromatic difference of magnification in the lens optical design or manufacturing phase. However, a method of reducing the chromatic difference of magnification that has been heretofore performed in the lens optical design or manufacturing phase causes an increase in costs or lens block. If the size of the lens is kept unchanged, the lens becomes a low magnification lens. On the other hand, by performing the detection and correction of the chromatic difference of magnification during the signal processing as in this embodiment, it is possible to easily achieve a smaller lens block of a camera, lower costs and a higher magnification.

Hereinafter, a fifth example for preventing the degradation of the edge detection accuracy due to noise is described. The amplitude and the strength of the noise occurring in image data generally become larger in proportion to the ISO speed. For example, regarding the edges with the same intensity, there is often the case where the edge is buried in the noise according to a change in S/N ratio depending on the ISO speed.

Figure 13A:
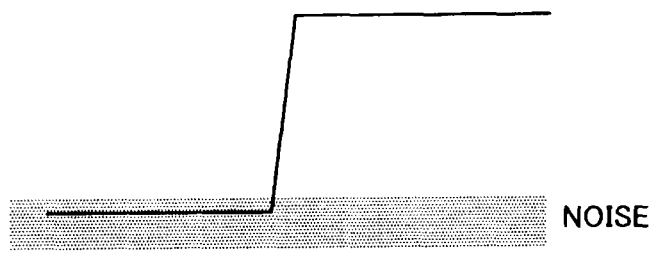
FIGS. 13A and 13B are explanatory views showing the level of a luminance signal.
Figure 13B:
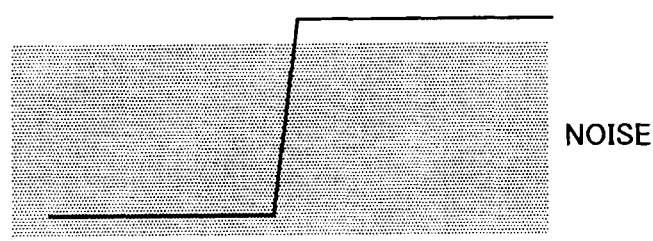

FIGS. 13A and 13B are explanatory views showing the level of a luminance signal. As shown in FIG. 13A, because the S/N ratio is good when the ISO speed is low, the edge is not buried in the noise, and the edge detection is less affected by the noise. On the other hand, as shown in FIG. 13B, because the S/N ratio is bad when the ISO speed is high, the edge is often buried in the noise, and the edge detection is likely to be affected by the noise, causing an increase in the frequency of occurrence of false detection.

In order to avoid the false detection described above, it is preferred to use a technique of varying a threshold for edge detection according to the ISO speed. For example, if a threshold is TH, a parameter indicating the degree of the ISO speed is ISO, and a threshold to be varied according to the ISO speed is TH', the threshold is varied like:

$$TH'=TH \times ISO$$

where parameter value at ISO 100: 1
  parameter value at ISO 200: 2
  parameter value at ISO 400: 4
  parameter value at ISO 100: 8
  parameter value at ISO 1600: 16
  parameter value at ISO 3200: 32.

Figure 14:
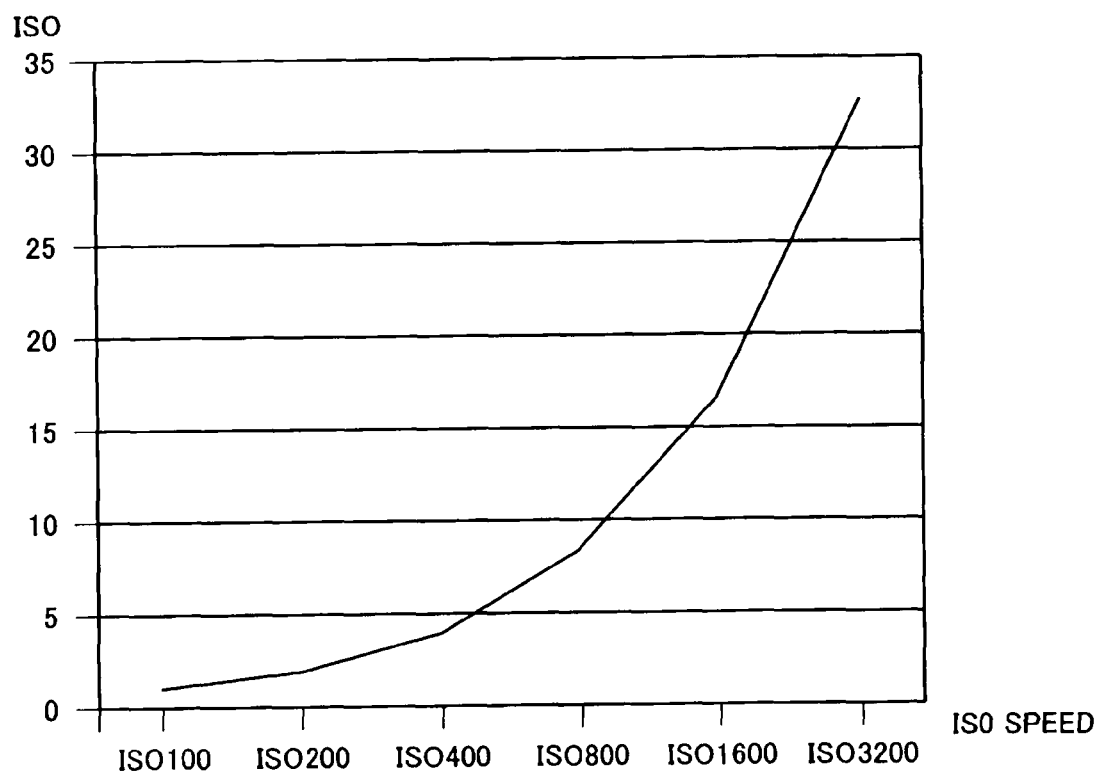
FIG. 14 is a graph showing the relationship between ISO and an ISO speed.

FIG. 14 shows an example of the above ISO parameters having different values according to a change in ISO speed. FIG. 14 is a graph showing the relationship between ISO and the ISO speed. In this example, the threshold TH is varied appropriately according to the ISO speed, thus allowing variation of the threshold according to the noise level. Consequently, it is possible to perform the edge detection that is less subject to the noise.

Figure 24:
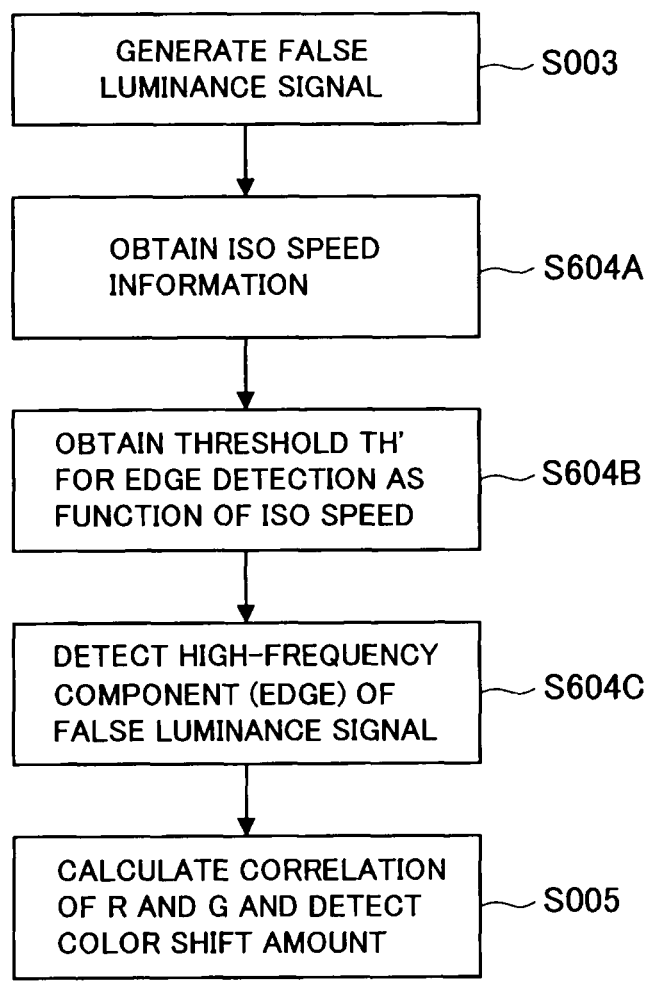
FIG. 24 is a flowchart showing an operation for detection and correction of chromatic difference of magnification.

FIG. 24 shows the flow of the above-described processing. This is improved processing of the step S004 in FIG. 18. Thus, the start of FIG. 24 is the output of the step S003 in FIG. 18, and the end of FIG. 24 is the input of the step S005 in FIG. 18.

First, ISO speed information when capturing image data is acquired from image data, for example (step S604A). Next, the threshold TH' for edge detection is obtained as a function of the ISO speed (step S604B). Then, HPF is performed on the false luminance signal in the radial direction, and the absolute value of an HPF result is compared with the threshold TH' for edge detection obtained in the step S604B, thereby detecting an edge (step S604C).

By using the edge detection result obtained in the step S604C as described above, a color shift amount is detected in the step S005.

(Method of Generating the Interpolated G Component)

A method of generating an interpolated G component to be used when performing HPF for edge detection is described hereinbelow.

When generating the interpolated G component, if addition is performed in the direction of HPF also, the frequency characteristics in the HPF direction are deteriorated, and the edge detection accuracy by HPF is also degraded accordingly. According to this alternative example, it is possible to prevent the degradation of the edge detection accuracy.

Figure 15A:
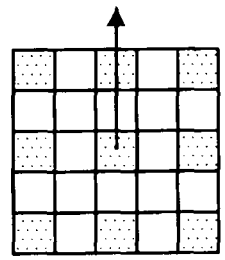
FIGS. 15A to 15D are explanatory views showing a pixel array.
Figure 15B:
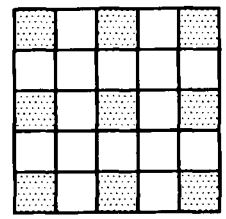
Figure 15C:
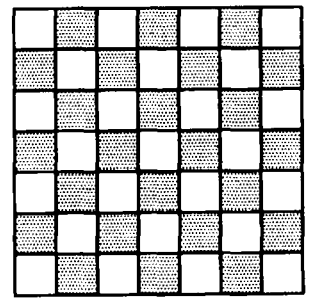
Figure 15D:
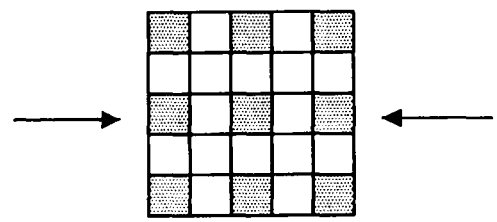

Consider, for example, a case of performing HPF for edge detection in the vertically upward direction as shown in FIG. 15A. FIGS. 15A to 15D are explanatory views showing a pixel array. HPF is performed using the false luminance signal. The false luminance signal is generated by generating the interpolated G component from the closest G component in the pixel positions of the R and B components, and the false luminance signal is composed of the interpolated G component and the R or B component. Specifically, when generating the false luminance signal in the position of the R component, the interpolated G components are generated as shown in FIG. 15D from the positions of the G components in FIG. 15C into the positions of the R components as shown in FIG. 15B, thereby aligning the phase of the R components and the G components.

Because HPF is performed in the vertically upward direction, when generating the interpolated G component in this alternative example, the G component in the vertical direction is not used, and the G component in the horizontal direction only is used (the direction of the arrow shown in FIG. 15D). It is thereby possible to prevent the deterioration of the frequency characteristics in the vertical direction, which is the HPF direction.

Although the case where HPF is performed vertically is described above, the G component to be used for generating the interpolated G component is selected on the basis of the same idea as the preprocessing in the case of performing HPF in the direction different from the vertical direction, such as when performing HPF in the horizontal direction or the oblique direction.

By generating the interpolated G component with use of the G component that is located only in the direction orthogonal to the HPF direction, it is possible to perform the edge detection more accurately.

Next, a method of generating an interpolated G component to be used when performing SAD (Sum of Absolute Difference) is described hereinbelow.

When generating the interpolated G component, if addition is performed in the direction of SAD also, the frequency characteristics in the SAD direction are deteriorated, and the detection accuracy of the chromatic difference of magnification by SAD is degraded accordingly. A technique for preventing this is described hereinafter.

Figure 16A:
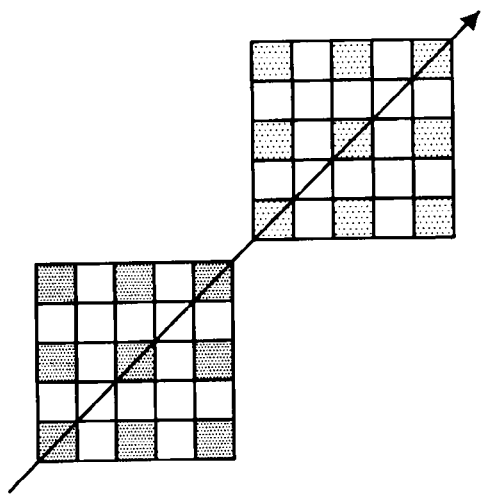
FIGS. 16A to 16D are explanatory views showing a pixel array.

FIGS. 16A to 16D are explanatory views showing a pixel array. Consider, for example, a case of performing SAD for the detection of the chromatic difference of magnification in the obliquely right upward direction as shown in FIG. 16A. After the false luminance signal is generated by using the R or B component and a modified G component and then edge detection is performed, SAD is performed by using the R or B component and the modified G component in the edge portion.

Figure 16B:
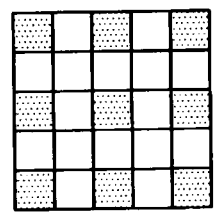
Figure 16C:
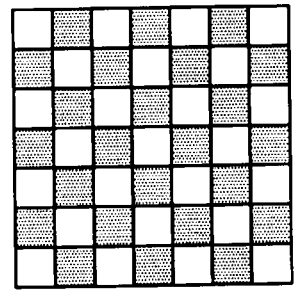

The modified G is generated by generating the interpolated G component from the closest G component in the pixel positions of the R and B components, and the modified G is composed of the interpolated G component and the R or B component. Specifically, when generating the false luminance signal in the position of the R component, the interpolated G components are generated as shown in FIG. 16D from the positions of the G components in FIG. 16C into the positions of the R components as shown in FIG. 16B, thereby aligning the phase of the R components and the G components.

Figure 16D:
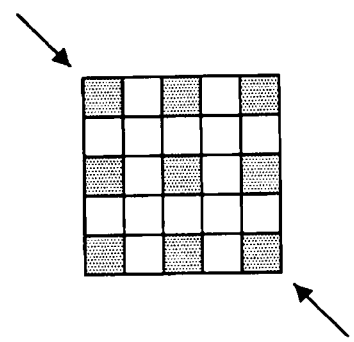

Because SAD is performed in the obliquely right upward direction, when generating the interpolated G component in this alternative example, the G component from the right oblique direction is not used, and the G component from the left oblique direction only is used (the direction of the arrow shown in FIG. 16D). It is thereby possible to prevent the deterioration of the frequency characteristics in the obliquely right upward direction, which is the SAD direction.

Although the case where SAD is performed obliquely rightward is described above, the G component to be used for generating the interpolated G component is selected on the basis of the same idea as the preprocessing in the case of performing SAD in the direction different from the right oblique direction, such as when performing SAD in the horizontal, vertical or left oblique direction.

By generating the interpolated G component with use of the G component that is located only in the direction orthogonal to the SAD direction, it is possible to perform the color shift amount detection more accurately.

(Method of Performing Interpolation)

A method of performing interpolation on the accuracy after the decimal point of a displacement of the R or B component with respect to the G component obtained by SAD is described hereinafter.

Although a result of SAD is obtained as an integer, the chromatic difference of magnification has several decimal digits of accuracy. By performing interpolation with use of the result obtained by SAD, it is possible to obtain the accuracy after the decimal point.

Figure 17:
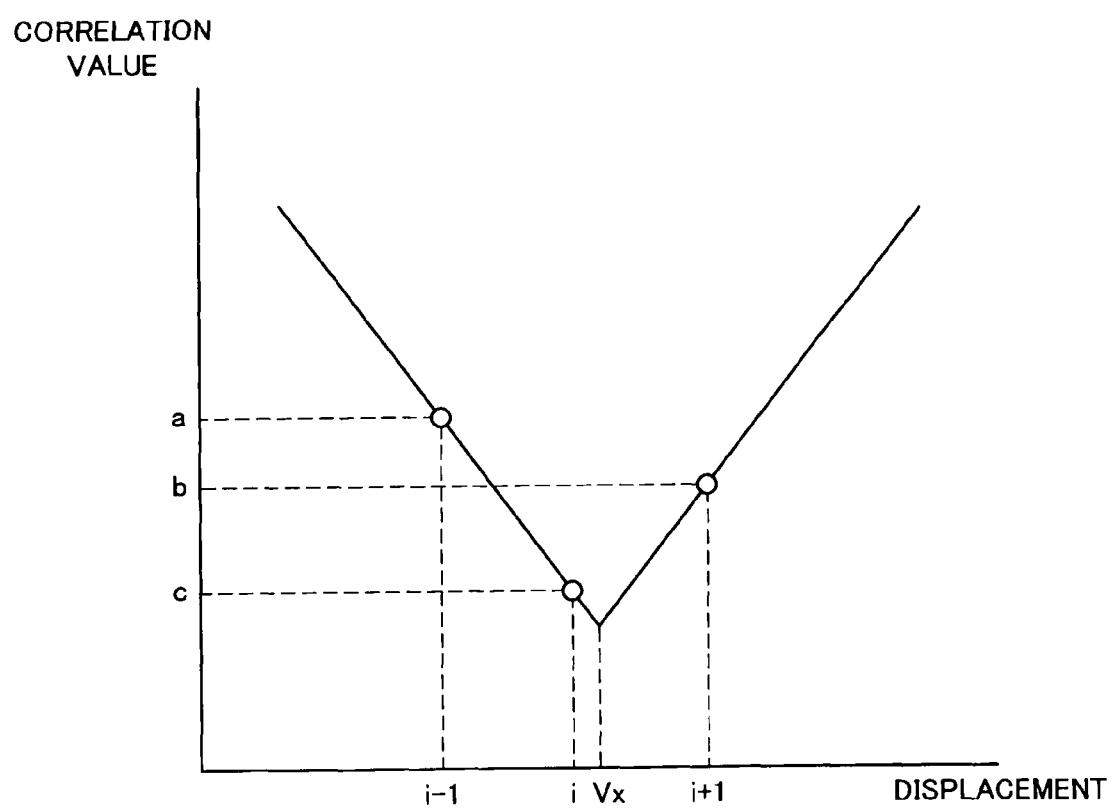
FIG. 17 is a graph showing the relationship between a correlation value and a displacement.

It is assumed that the aberration with a minimum value of a displacement i is detected by SAD as shown in FIG. 17. FIG. 17 is a graph showing the relationship between a correlation value and a displacement. An interpolation value Vx is represented with use of the displacement and the correlation value shown in FIG. 17 as:

$$Vx = i + (a-b)/[2 \times \{\max(a,b) - c\}]$$

This is the expression calculating the horizontal axis coordinates at the intersection of two straight lines shown in FIG. 17.

This interpolation method is based on the idea of placing a minimum point on a connection that enables a connection with a larger slope when connection is made to the minimum point at points located to the left and right of the minimum point.

Although the accuracy of the number of pixels or the detection accuracy after the decimal point has not existed in SAD, this technique enables obtainment of the detection accuracy after the decimal point exceeding the accuracy of the number of pixels.

1. The threshold for edge detection is varied according to the indicator allowing estimation of the noise level, e.g. the ISO speed, regardless of whether the luminance level is saturated or not, so that an edge to be used for detection can be determined appropriately. It is thereby possible not to perform detection at the edge which is buried in the noise, thus enabling the detection of the chromatic difference of magnification that is not subject to the noise level, without degradation of the detection accuracy even in the shooting conditions with a low light level or a bad S/N ratio.

2. In the generation of the interpolated G component, the interpolated G component is generated with use of the G component that is located only in the direction orthogonal to the HPF direction in consideration of the direction of HPF for edge detection to be performed as the subsequent processing. It is thereby possible to prevent the deterioration of the frequency characteristics of the interpolated G component in the HPF direction during HPF, so that HPF can be performed by using the interpolated G component with high-frequency information remained sufficiently without being rounded in the HPF direction.

As a result, it is possible to detect the high-frequency component in faithful accordance with an input image, thus enabling the accurate detection of the chromatic difference of magnification.

3. When performing SAD, the interpolated G component is generated with use of the G component that is located only in the direction orthogonal to the shift direction in consideration of the shift direction of the R or B window with respect to the interpolated G window. It is thereby possible to prevent the deterioration of the frequency characteristics of the interpolated G component in the shift direction during SAD, so that SAD can be performed by using the interpolated G component with high-frequency information remained sufficiently without being rounded in the shift direction.

As a result, it is possible to detect the color shift amount in faithful accordance with an input image, thus enabling the accurate detection of the chromatic difference of magnification.

4. On a detection result of the chromatic difference of magnification that does not have accuracy after the decimal point, the interpolation is performed to interpolate the accuracy after the decimal point, thereby enabling the detection result with low accuracy (without accuracy after the decimal point) to have high accuracy (have accuracy after the decimal point). Because the chromatic difference of magnification originally has the accuracy after the decimal point, this allows the detection result to be closer to the true chromatic difference of magnification, thus enabling the accurate detection of the chromatic difference of magnification.

The present application contains subject matter related to that disclosed in Japanese Priority Patent Application JP 2008-208038 filed in the Japan Patent Office on Aug. 12, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

Although RAW data in a Bayer array is used in the above embodiment, the above description is the same when using a pixel array different from the Bayer array. Specifically, in the detection of the color shift, a reference position of the G component that is used when interpolating the G component depends on the pixel array different from the Bayer array, and during the interpolation, a reference position of the R component or the B component that is used when interpolating the R component or the B component depends on the pixel array different from the Bayer array.

What is claimed is:

1. An image processing apparatus comprising:
    an image signal extraction unit to extract at least a part of an image signal from image data based on signal characteristics of the image signal;
    a threshold calculation unit to calculate a threshold as a function of one or more of a height of an image represented by the image data or edge strength of the image;
    an edge detection unit to detect an edge portion in the image data from the extracted image signal by applying high-pass filter processing to only a luminance value of the image signal, and to compare a result of the high-pass filter processing to the threshold to identify a high-frequency component as the edge portion; and
    a color shift amount detection unit to detect a color shift amount by calculating a correlation of at least two color components contained in the image signal according to a distance from a reference position at the edge portion in the image data.

2. The image processing apparatus according to claim 1, wherein
    the image signal extraction unit includes:
        a determination unit to determine whether the luminance value of the image signal is at a saturation level or near the saturation level; and
        a first extraction unit to extract the image signal different from the image signal determined to be at the saturation level or near the saturation level.

3. The image processing apparatus according to claim 1, wherein the threshold varies according to a non-linear function.

4. The image processing apparatus according to claim 3, further comprising a lens, wherein the non-linear function is based on a characteristic of the lens.

5. The image processing apparatus according to claim 1, wherein the threshold varies according to a linear function.

6. The image processing apparatus according to claim 1, wherein the threshold is calculated based on both the height of the image represented by the image data and the edge strength of the image.

7. The image processing apparatus according to claim 1, wherein the threshold is calculated based on the height of the image represented by the image data.

8. The image processing apparatus according to claim 1, wherein the threshold is calculated based on the edge strength of the image.

9. An image processing method comprising the steps of:
    extracting at least a part of an image signal from image data based on signal characteristics of the image signal;
    detecting an edge portion in the image data from the extracted image signal by applying high-pass filter processing to only a luminance value of the image signal;
    calculating a threshold as a function of one or more of a height of an image represented by the image data or edge strength of the image;
    comparing a result of the high-pass filter processing to the threshold and identifying a high-frequency component as the edge portion; and
    detecting a color shift amount by calculating a correlation of at least two color components contained in the image signal according to a distance from a reference position at the edge portion in the image data.

10. The method of claim 9, further comprising:
    interpolating a G component of the image data in a pixel position of an R or B component of the image data to generate an interpolated G component; and
    generating the luminance value by averaging the R or B component with the interpolated G component.

11. An image processing apparatus comprising:
    an image signal extraction unit to extract at least a part of an image signal from image data based on signal characteristics of the image signal;
    a threshold calculation unit to calculate the threshold as a function of ISO speed;
    an edge detection unit to detect an edge portion in the image data from the extracted image signal by applying high-pass filter processing to only a luminance value of the image signal, and to compare a result of the high-pass filter processing to the threshold to identify a high-frequency component as the edge portion; and
    a color shift amount detection unit to detect a color shift amount by calculating a correlation of at least two color components contained in the image signal according to a distance from a reference position at the edge portion in the image data.

* * * * *